United States Patent
Raymer et al.

(10) Patent No.: US 10,761,229 B2
(45) Date of Patent: Sep. 1, 2020

(54) MICROSEISMIC SENSITIVITY ANALYSIS AND SCENARIO MODELLING

(71) Applicant: Schlumberger Technology Corporation, Sugar Land, TX (US)

(72) Inventors: Daniel Raymer, Brisbane (AU); William Brian Underhill, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 297 days.

(21) Appl. No.: 15/539,136

(22) PCT Filed: Feb. 19, 2016

(86) PCT No.: PCT/US2016/018590
§ 371 (c)(1),
(2) Date: Jun. 22, 2017

(87) PCT Pub. No.: WO2016/134210
PCT Pub. Date: Aug. 25, 2016

(65) Prior Publication Data
US 2017/0371051 A1    Dec. 28, 2017

Related U.S. Application Data

(60) Provisional application No. 62/118,779, filed on Feb. 20, 2015.

(51) Int. Cl.
*G01V 1/28* (2006.01)
*G01V 1/00* (2006.01)

(52) U.S. Cl.
CPC .............. *G01V 1/282* (2013.01); *G01V 1/003* (2013.01); *G01V 2210/1234* (2013.01); *G01V 2210/30* (2013.01)

(58) Field of Classification Search
CPC .... G01V 1/282; G01V 1/003; G01V 2210/30; G01V 2210/1234
See application file for complete search history.

(56) References Cited

U.S. PATENT DOCUMENTS 8,589,078 B2    11/2013    Djikpesse et al.
9,945,970 B1 *   4/2018    Abel ..................... G01V 1/288
(Continued)

OTHER PUBLICATIONS

Sanyog Kumar, Upper and lower bakken shale production contribution to the middle bakken reservoir (Year: 2014).*
(Continued)

*Primary Examiner* — Mohammad K Islam

(57) ABSTRACT

Systems, methods, and computer-readable media for designing a microseismic monitoring project. The method includes receiving data representing the microseismic monitoring project for at least one subterranean volume, the data including data representing a plurality of factors associated with a design of the microseismic monitoring project. The method also includes conducting a sensitivity analysis to determine a relative sensitivity between at least two of the plurality of factors, and determining whether to update a modelling scenario for the microseismic monitoring project based on the relative sensitivity.

16 Claims, 17 Drawing Sheets

(56) References Cited

U.S. PATENT DOCUMENTS

| | | | |
|---|---|---|---|
| 2005/0192855 A1* | 9/2005 | Chitty | E21B 49/008 705/1.1 |
| 2009/0010104 A1 | 1/2009 | Leaney | |
| 2009/0168599 A1 | 7/2009 | Suarez et al. | |
| 2011/0054869 A1* | 3/2011 | Li | G06F 17/5009 703/10 |
| 2013/0062057 A1* | 3/2013 | Smith, Jr. | E21B 43/267 166/254.2 |
| 2013/0140031 A1* | 6/2013 | Cohen | E21B 43/26 166/308.1 |
| 2013/0346359 A1* | 12/2013 | Lu | G06F 16/284 707/600 |
| 2014/0102694 A1* | 4/2014 | Hargreaves | G01V 1/003 166/250.01 |
| 2014/0200854 A1* | 7/2014 | Eggenberger | G01V 1/003 702/189 |
| 2014/0305638 A1 | 10/2014 | Kresse et al. | |
| 2015/0120198 A1* | 4/2015 | Rebel | G01V 1/288 702/14 |
| 2015/0120255 A1* | 4/2015 | King | E21B 43/00 703/2 |
| 2015/0193707 A1* | 7/2015 | Garibaldi | G06Q 10/0635 705/7.28 |
| 2016/0042272 A1* | 2/2016 | Mohaghegh | G06N 3/0472 706/19 |
| 2016/0260180 A1* | 9/2016 | Vasquez | E21B 41/0092 |
| 2017/0139066 A1* | 5/2017 | Ray | G01V 1/288 |

OTHER PUBLICATIONS

Xie et al. Integration of Shale Gas Production Data and Microseismic for Fracture and Reservoir Properties Using Fast Marching Method (Year: 2012).*

Curtis, et al., "A deterministic algorithm for experimental design applied to tomographic and microseismic monitoring surveys," Geophysical Journal International, 2004, vol. 157, Issue 2, pp. 595-606.

Raymer, et al., "New techniques to improve microseismic event detection and location in surface data," Second EAGE Workshop on Permanent Reservoir Monitoring, 2013.

Raymer, et al., "Microseismic Network Design—Estimating Event Detection," Proceedings of the 73rd EAGE Conference, Vienna, C011, 2011.

Urhammer, 1980, "Analysis of small seismographic station networks," Bulletin of the Seismological Society of America, vol. 70, No. 4, 1980, pp. 1369-1379.

International Search Report and Written Opinion for the equivalent International patent application PCT/US2016/018590 dated May 12, 2016.

International Preliminary Report on Patentability for the equivalent International patent application PCT/US2016/018590 dated Aug. 31, 2017.

* cited by examiner

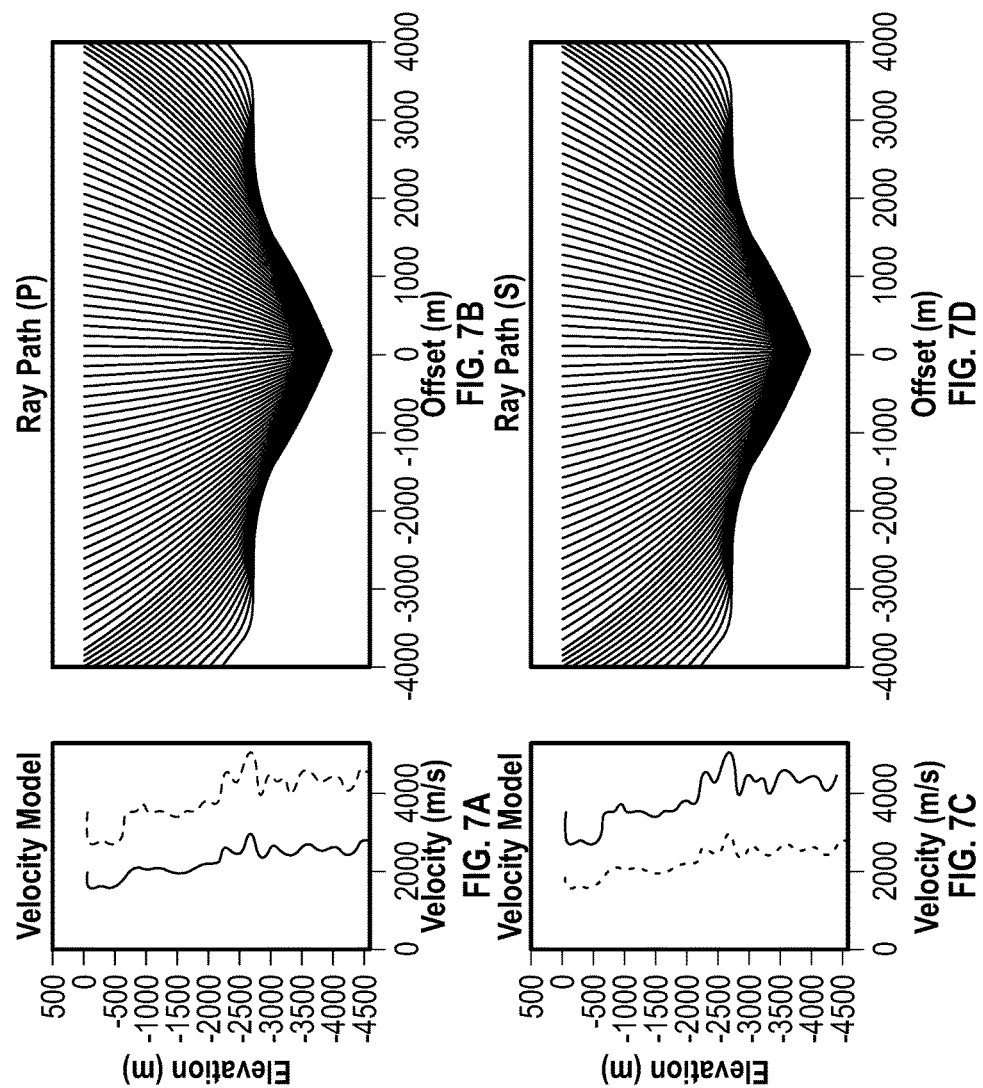

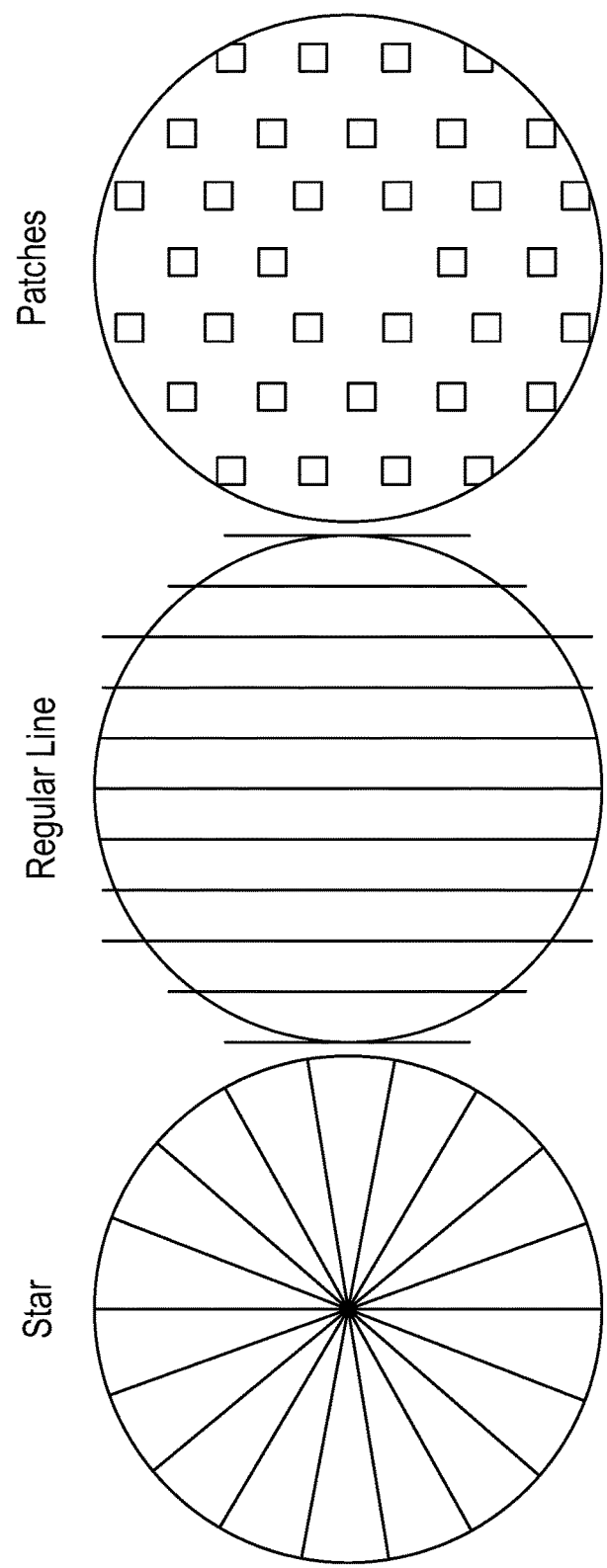

Effective Noise = 1e-5m.S$^{-1}$ .S$^{-1}$

MICROSEISMIC SENSITIVITY ANALYSIS AND SCENARIO MODELLING

CROSS-REFERENCE TO RELATED APPLICATIONS

This application claims priority to U.S. Provisional Patent Application No. 62/118,779, entitled "Microseismic Sensitivity Analysis and Scenario Modelling," filed Feb. 20, 2015, the content of which is incorporated herein in its entirety.

BACKGROUND

Microseismic monitoring can be used for monitoring hydraulic fracture stimulation treatments in unconventional fields, as well as reservoir monitoring, carbon dioxide sequestration, gas storage, and other applications. In the example of hydraulic fracture stimulation, the treatments cause fractures to propagate in the formation, with the fracturing in turn generating microseismic events that act as a source for seismic waves that also propagate in the formation. Receiver sensor arrays (e.g., geophones) can be positioned, generally in a monitoring borehole or along the Earth's surface, to detect and record the arrival of the seismic waves.

Based on a model of the relevant subterranean volume, the characteristics of the waveform recorded by the receivers may be used, in a process known as inversion, to determine information about the source of the seismic waves (e.g., fracture propagation). Such information may include the general location of the event, moment tensors, and other information. Generally, the inversion process includes considering direct-arrival compression waves and shear waves (both Sh and Sv arrivals).

Experimental design methods have been applied in the survey design of microseismic monitoring projects. Those techniques can involve, for example, choosing or modifying the location, type, and/or configuration of geophones or other sensors, or arrays of those sensors, to try to arrive at a desired sensitivity or accuracy for the overall detection configuration. These studies allow different experiment setups to be tested statistically, to find a desired or advantageous experimental setup. These can be very successful but in practice, they can take a large amount of work to set up the parameters. Fielding the appropriate sensor and other hardware, and adjusting other parameters, can involve appreciable cost and time. Further, it may be difficult to make adjustments to apply in a variety of different scenarios without well-defined or constrained knowledge of input parameters.

SUMMARY

Embodiments of the present disclosure may provide a method for designing a microseismic monitoring project. The method includes receiving data representing the microseismic monitoring project for at least one subterranean volume, the data including data representing a plurality of factors associated with a design of the microseismic monitoring project. The method also includes conducting a sensitivity analysis to determine a relative sensitivity between at least two of the plurality of factors, and determining whether to update a modelling scenario for the microseismic monitoring project based on the relative sensitivity.

In some embodiments, the method may further include updating the modelling scenario. Updating the modelling scenario includes at least one of increasing knowledge of at least one of the plurality of factors, or changing one or more operations of the microseismic monitoring project.

In some embodiments, the plurality of factors includes at least one of a source model, an earth model, or a noise model. In some embodiments, the plurality of factors includes a source model, and the seismic source model includes a source magnitude value. In some embodiments, the plurality of factors includes an earth model, and the propagation model includes a Q value for at least part of the at least one subterranean volume. In some embodiments, the plurality of factors includes a noise model, and the noise model includes a root mean square (RMS) noise value. In some embodiments, the plurality of factors includes at least one of a type of sensor, a sensor sensitivity, or a sensor spacing.

In some embodiments, determining a relative sensitivity includes generating a tornado chart representing a sensitivity range of the at least two of the plurality of factors.

In some embodiments, conducting a sensitivity test includes specifying a minimum value, a base value, and a maximum value for variables associated with at least one of the plurality of factors.

In some embodiments, the method also includes generating an objective function for the microseismic monitoring project, wherein the objective function includes a number of detected microseismic events.

Embodiments of the disclosure may also provide a non-transitory computer-readable medium storing instructions that, when executed by at least one processor of a computing system, cause the computing system to perform operations. The operations include receiving data representing a microseismic monitoring project for at least one subterranean volume, the data including data representing a plurality of factors associated with a design of the microseismic monitoring project. The operations also include conducting a sensitivity analysis to determine a relative sensitivity between at least two of the plurality of factors, and determining whether to update a modelling scenario for the microseismic monitoring project based on the relative sensitivity.

Embodiments of the disclosure may also provide a computing system including one or more processors and a memory system. The memory system includes one or more non-transitory computer-readable media storing instructions that, when executed by at least one of the one or more processors, cause the computing system to perform operations. The operations include receiving data representing a microseismic monitoring project for at least one subterranean volume, the data including data representing a plurality of factors associated with a design of the microseismic monitoring project. The operations also include conducting a sensitivity analysis to determine a relative sensitivity between at least two of the plurality of factors, and determining whether to update a modelling scenario for the microseismic monitoring project based on the relative sensitivity.

Embodiments of the present disclosure may provide a computing system. The computing system may include means for receiving data representing the microseismic monitoring project for at least one subterranean volume, the data including data representing a plurality of factors associated with a design of a microseismic monitoring project. The system also includes means for conducting a sensitivity analysis to determine a relative sensitivity between at least two of the plurality of factors, and means for determining whether to update a modelling scenario for the microseismic monitoring project based on the relative sensitivity.

Embodiments of the present disclosure may provide a computing system. The computing system may include one or more processors and may be configured receive data representing a microseismic monitoring project for at least one subterranean volume, the data including data representing a plurality of factors associated with a design of the microseismic monitoring project. The computing system may also be configured to conduct a sensitivity analysis to determine a relative sensitivity between at least two of the plurality of factors, and to determine whether to update a modelling scenario for the microseismic monitoring project based on the relative sensitivity.

It will be appreciated that the foregoing summary is intended merely to introduce several aspects of the disclosure that follows. These and other aspects are described in greater detail below. Accordingly, this summary is not intended to be exhaustive, and thus should not be considered limiting.

BRIEF DESCRIPTION OF DRAWINGS

The accompanying drawings, which are incorporated in and constitute a part of this specification, illustrate embodiments of the present teachings and together with the description, serve to explain the principles of the present teachings.

FIGS. 7A, 7B, 7C, and 7D illustrate several models of ray propagation, according to some embodiments.

FIG. 9 illustrates a comparison of seveal sensor configurations, according to some embodiments.

DETAILED DESCRIPTION

Figure 1:
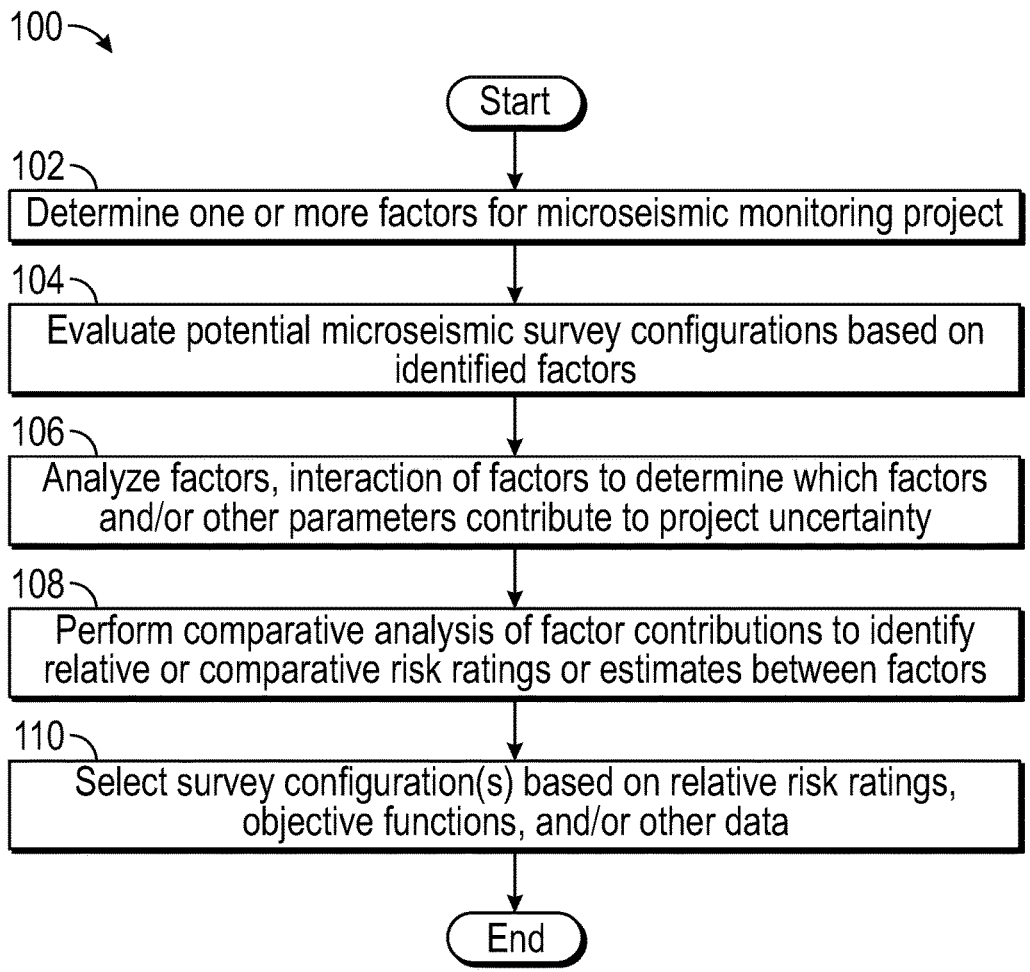
FIG. 1 illustrates a flowchart of aspects of processing related to analysis of factors for a microseismic monitoring project, according to some embodiments.

Reference will now be made in detail to embodiments, examples of which are illustrated in the accompanying drawings and figures. In the following detailed description, numerous specific details are set forth in order to provide a thorough understanding of embodiments. However, it will be apparent to one of ordinary skill in the art that embodiments may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of embodiments. The first object or step, and the second object or step, are both, objects or steps, respectively, but they are not to be considered the same object or step.

The terminology used in the description of embodiments herein is for the purpose of describing particular embodiments only and is not intended to be limiting of embodiments. As used in the description of embodiments and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Systems, methods, and computer-readable media according to some embodiments herein can be used to support and/or implement microseismic monitoring or survey projects. In general, a microseismic monitoring project can be assessed a variety of ways depending, e.g., on the background of the personnel handling the evaluation and the objectives at hand. For example, a geophysicist may be more interested determining the number of microseismic events detected, the number of mapped hypocenters, the quality of the events detected, the quality of the mapped hypocenters, the data quality and receiver spread suitability for inverting for source characteristics (e.g., source parameters, source mechanisms, etc.). Meanwhile, production and stimulation engineers may be more interested in determining whether the pay zone targeted is covered, whether there is appropriate zonal isolation, whether the activity is well contained, whether the well be landed in a different place, whether the stimulation applied was effective, whether the stimulated intervals are covered, whether there is any structure (e.g., fault, pinch out), etc. The ability to model, quantify, predict, and evaluate alternative microseismic survey configurations may be valuable to those types of personnel, and others.

Microseismic Analysis: Factors Generally

A microseismic monitoring or survey project can be analyzed according to some embodiments herein using one or more factors. FIG. 1 illustrates a flowchart of a method 100 for analysing such a microseismic monitoring project, according to an embodiment. It will be appreciated that the order of the actions of the illustrated embodiment of the method 100 may be modified, two or more of the actions may be combined into a single action, and/or individual ones of the actions may be broken out into two or more actions, without departing from the scope of the present disclosure. This applies generally to each of the methods described herein.

As shown, the method 100 can include determining one or more such factors for the microseismic monitoring project, as at 102. As used herein, a "factor" can be or include a model, simulation, estimation, mapping, or other representation of a physical or operational component of the subject geographic site, along with the equipment and processing used to detect and identify seismic conditions and other variables associated with a subterranean volume.

In some embodiments, potential microseismic survey configurations can be evaluated based on such factors, e.g., factors including a source model, an earth model, and a noise model, as at 104. Factors and/or the interaction of those factors and/or others can be manipulated and analyzed to determine parts of the overall monitoring configuration which contribute to project uncertainty or risk, and, e.g., to what degree, as at 106. While those factors are discussed in connection with embodiments described herein, it will be appreciated that other numbers, types, formats, or other versions of factors can also or instead be used. In 108, a comparative analysis of factor contributions can be performed to identify relative or comparative risk ratings between different factors. In 110, one or more survey configurations can be selected based on relative risk ratings, one or more objective functions, and/or other data.

Source Model

A source model can be used as one factor. That factor can include parameters that define the model. Embodiments herein can analyze the sensitivity of a selected set of the defining parameters for the source model and other models. For example, the source model can represent or encapsulate the characteristics of the microseismic source events being generated and/or tracked. Those events can be or include rock failures or other geological events which produce seismic waves, shock waves, pressure waves, acoustic waves, and/or other types of radiated energy in a subterranean volume or mass. The events can be caused by, and/or associated with, events such as explosions, changes in pressure, tremors or shifts in geological formations, and/or other events or conditions which generate or distribute energy. The source model can describe and characterize those events, including factors or variables such as where will they take place, how energetic will they be, and/or what source mechanism and radiation patterns will they display. One parameter that can be associated with the source model is a magnitude value, indicating the total seismic energy present in a microseismic event.

Earth Model

An earth model can be used as another factor. The earth model can characterize features related to the way that seismic or other energy travels through the subterranean volume of earth as a result of source events. The earth model can include features, variables, and/or parameters such as how efficiently the seismic energy propagates from the source to the sensors used to detect the propagation of seismic energy. The earth model can represent or characterize the geological structures, velocities, and intrinsic attenuation of the formations the signal must pass through to arrive at the sensors used in the survey or study.

One parameter that can be associated with the earth model is a Q value, representing an intrinsic attenuation caused by the earth volume through which seismic signals travel. It will be appreciated that Q may vary by wave type. In various embodiments, Q may refer to P-wave models (Qp), S-wave models (Qs), combinations thereof (e.g., both Qs and Qp reflected by a scaling percentage as part of an overall Q), as well as for isotropic S-waves in a vertical (Qsv) and/or horizontal direction (Qsh).

Noise Model

A noise model can also be used as a factor herein. The noise model can generally relate to variables affecting the sensitivity and discrimination of seismic or other sensors used to detect and identify signals generated by the source event. When the seismic energy radiating from the source finally reaches the receiver array, its detection depends on the signal strength compared to other signals at the receiver array, including noise. Knowledge of the noise model allows one to determine how the noise can be reduced through techniques such as by signal processing and receiver array design. In some embodiments, the sensor or sensors used to detect microseismic activity can be or include seismic sensors, such as surface-mounted or other geophones. It will be appreciated that in embodiments, other types or varieties of sensors can be used, such as, for example, electromagnetic or optical sensors, and/or others.

Survey Site Configuration Generally

Figure 2:
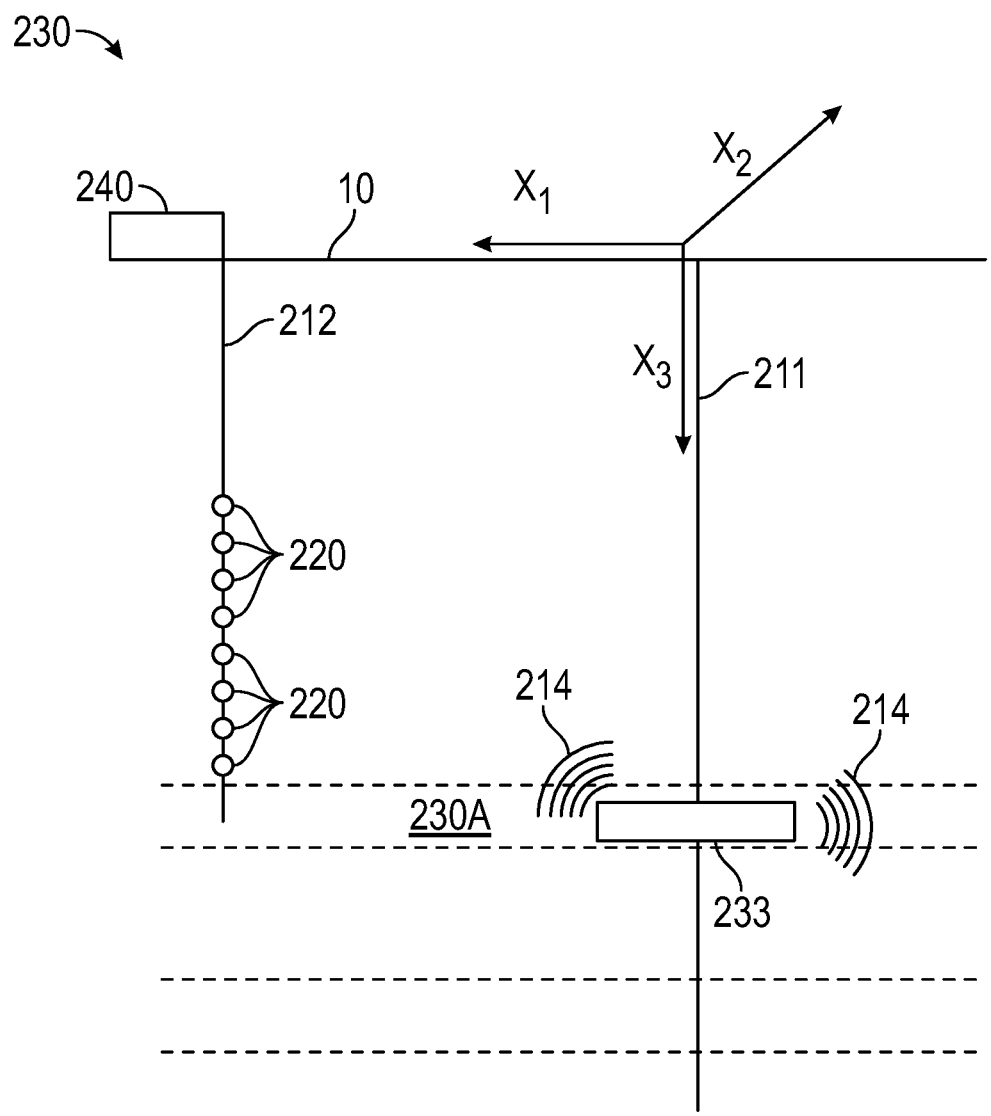
FIG. 2 illustrates a schematic view of an oilfield and its operation, according to some embodiments.

FIG. 2 illustrates a schematic view of an overall system 200 for obtaining microseismic data related to hydraulic fracturing, according to some embodiments. As depicted, a monitoring borehole 212 is positioned near a fracturing borehole 211; both the monitoring borehole 212 and the fracturing borehole 211 extend from a surface 210 through an Earth formation 230. A geophone array 220 may be disposed in the monitoring borehole 212. The geophone array 220 may include a plurality of geophones. In some aspects the geophones may be or include three-component geophones. Merely by way of example, the monitoring borehole 212 may be of the order of hundreds of meters from the fracturing borehole and the geophones in the geophone array 220 may be spaced of the order of tens of meters apart. The characteristics of the geophone array 220, including, for example, type, sensitivity, spacing, etc. of the geophones thereof, may also be factors analysed as part of the methods herein, according to an embodiment.

During hydraulic fracturing, a fluid (not shown) is pumped from the surface 210 into the fracturing borehole 211 so as to cause the Earth formation 230 surrounding the fracturing borehole 211 to fracture, resulting in the generation of a fracture 233 in the Earth formation 230. The fluid may be pumped down the fracturing borehole 211 to provide for the fracturing of a hydrocarbon bearing layer 230A in the Earth formation 230. In such an arrangement where the portion of the Earth formation 230 being fractured is the hydrocarbon bearing layer 230A, the fracture 233 is produced at least partially within the hydrocarbon bearing layer 230A. By generating the fracture 233 at least partially within the hydrocarbon bearing layer 230, production channels may be set up in the hydrocarbon bearing layer 230A allowing for flow of the hydrocarbons in the hydrocarbon bearing layer 230A through the Earth formation 230 to the fracturing borehole 211.

One possibility is that the hydrocarbon bearing layer is a shale layer or formation. A reservoir which is or includes a shale formation is generally of low permeability and is stimulated by fracturing in order to achieve production, but incorporates natural fractures which become connected to the newly-formed fracture.

During the fracturing process, seismic waves 214 are generated by the fracture 233 and the seismic waves 214 may propagate through the Earth formation 230 and be detected by the geophone array 220. As such, the geophone array 220 in the monitoring borehole 212 may be used to collect microseismic data related to the hydraulic fracturing procedure taking place in the fracturing borehole 211. The geophones in the geophone array may include three-component geophones and may provide directional (three-dimensional) data for the received seismic waves 214. The data received by the geophone array 220 may be recorded and then processed and/or transmitted to a processor 240 for processing. In other embodiments of the present invention, more than one monitoring borehole 212 may be used and/or geophones may be located at the surface 210 or other locations.

The geophones in the array 220 are used to record microseismic wavefields generated by the hydraulic fracturing. By inverting the obtained microseismic wavefields, locations of microseismic events may be determined as well as uncertainties for the determined locations, source mechanisms and/or the like. The set of event locations and the corresponding uncertainties is known as the "microseismic event cloud."

Embodiments of the present disclosure may provide one or more methods for sensitivity analysis and scenario modelling. When planning a microseismic monitoring project, the chance of a successful project may depend on one or more factors, including those noted above and possibly others. In some embodiments, a priori knowledge of at least some of these factors may be relatively low, and expected values may be constrained as additional data is acquired. This data may be obtained from measurements made in the field, results of previous monitoring, analogies to similar formations etc. By assessing knowledge of these factors, determining the likely range of their values and the accuracy of this knowledge and using it in forward modelling, the likelihood of successful microseismic monitoring project may be assessed. Further, the design of the project may be determined, and/or additional information to acquire before deciding to implement a particular monitoring project design may also be determined. The cost of a modelling study may save the cost of a full monitoring project in an area where the project may not be effective or may not work and/or allow an enhanced monitoring setup to be used.

Success in a microseismic monitoring project may be based at least in part on microseismic events being detected, a number of events detected so as to image the fracture network created during stimulation, and data quality and spread suitable to support inverting for source characteristics such as event location and source mechanisms.

At least some of the factors that impact this success may be grouped into several (e.g., three) general areas of the physical properties of the system being considered. These areas may include the source model, the earth model, and the noise model, which are for example schematically depicted in FIG. 3. The source model may include characteristics of the events being generated, where they will be created, their size, source mechanisms, and radiation patterns. The earth model may represent how well the seismic energy propagates from the source to the receiver locations. The earth model may contain information related to the structure, velocities, and intrinsic attenuation of the rocks that the signal passes through. Regarding the noise model, when the seismic energy reaches the receiver its detection may depend on the strength of the signal compared to other signals at the receiver, i.e., the noise. As further shown in FIG. 4, in embodiments the noise model may allow a determination of how the noise can be reduced by signal processing, receiver array design, and/or other techniques, based on an understanding of the source model and propagation paths and intensities reflected in the earth model. Any of these models may take into consideration the characteristics of the geophones in the array.

Figure 5:
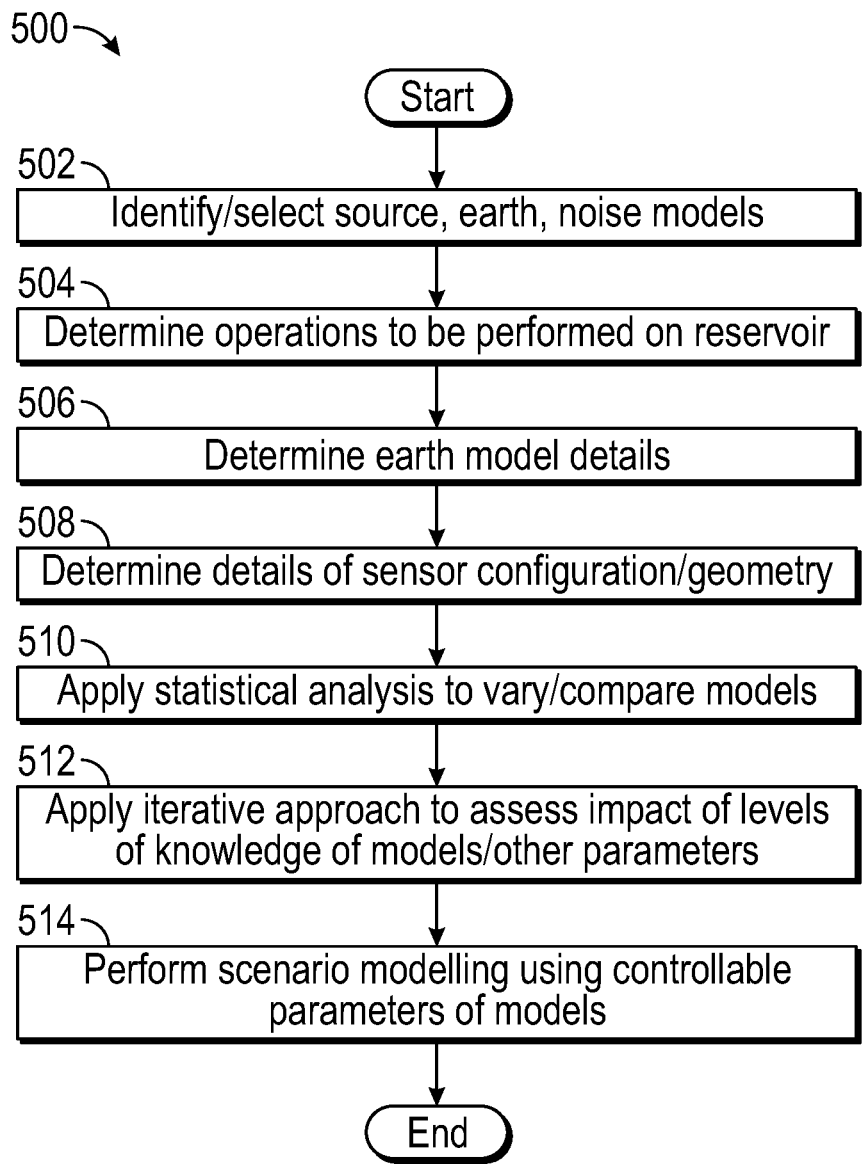
FIG. 5 illustrates a flowchart of aspects of comparative analysis between project factors, according to some embodiments.

The factors above and others may relate to the physical properties of the system and detection of the signal. Although these factors may generally be fixed in a given project, they may be influenced by monitoring decisions and/or operational considerations. FIG. 5 depicts a flowchart of aspects of those operations, denoted generally by reference number 500. In 502, operations can include to identify and/or select source, earth, and noise models for the project. In 504, operations can include to determine the intended operations to be performed on the subject reservoir. For example, the source model, in terms of levels of seismicity, may depend on or be adjusted according to the operations being performed on the reservoir, e.g., the target of the monitoring. In cases, the source type and strength may depend on in-situ conditions that cannot be controlled. Factors controlling source include state of stress, natural fractures, layering and other mechanical discontinuities, permeability and pore fluid content and saturation.

Source type and strength may also be affected by different types of operations. For monitoring of hydraulic fracturing, as an example, information about the operations may include the treatment plan and factors such as pumping rates, proppant concentrations etc. Other factors may include amounts and rates of injection into reservoir ($CO_2$ sequestration, gas storage, water injection) or production (oil and gas production).

In 506, operations can be conducted to determine or select an earth model, for instance, to select a value for Q or other parameters. In 508, a sensor configuration and/or geometry can be determined. The choice of sensors, their number, and their distribution may also impact the earth model contribution, as these factors may at least partially determine the distance and path taken between microseismic source and receiver. The network geometry may determine how well signal is detected and how well the signal detected constrains the inversions for properties of the microseismic events, such as location and moment tensor.

The noise model contribution on monitoring may be related to sensor network properties, which may determine proximity to potential noise sources and pathways to the sensors. The sensor array geometry may also indicate the type of noise attenuation that may be performed during processing in terms of filtering and stacking the data. In some embodiments, noise generation, or propagation, may be reduced (e.g., if the source or propagation pathway can be identified and improved by human control).

In 510, a statistical analysis can be conducted to identify, understand, analyze, vary, and compare knowledge of the different factors that can influence the success of a microseismic monitoring project. Embodiments may facilitate the quantification and visualization of the improvement in knowledge of performance of a monitoring project through acquisition of additional data, application of different processing workflows, and/or use of different acquisition designs. Further, embodiments of the present disclosure may combine statistical analysis with microseismic event population distribution theory. This may provide a methodology to monitor parameters based on the number of detectable events.

By following a sensitivity study based scenario modelling methodology, the uncertainties regarding the likely success of a monitoring project may be calculated and sources of contribution to uncertainty may be identified. These uncertainties may be targeted for reduction, e.g., by the acquisition of more data. The methodology may also include the assessment of the impact of different acquisition designs and processing workflows. This may allow an improved understanding of risks associated with proceeding with the monitoring project and improved decision making on selecting acquisition types and geometries. Embodiments of the present disclosure include a sensitivity analysis based decision making method that is applicable to wide range of knowledge of input parameters.

In 512, an iterative approach can be conducted or applied to assess the impact of levels of knowledge on physical properties related to a project. The iterative approach can guide users to areas to improve the knowledge to better assess a project's viability, such as by repeatedly refining the effect of adjustments to the noise model or other factors. In 514, operations can be conducted to perform scenario modelling of the aspects of the project using controllable parameters. This modelling and other analysis can facilitate determining an experimental setup within the constraints available.

Figure 3:
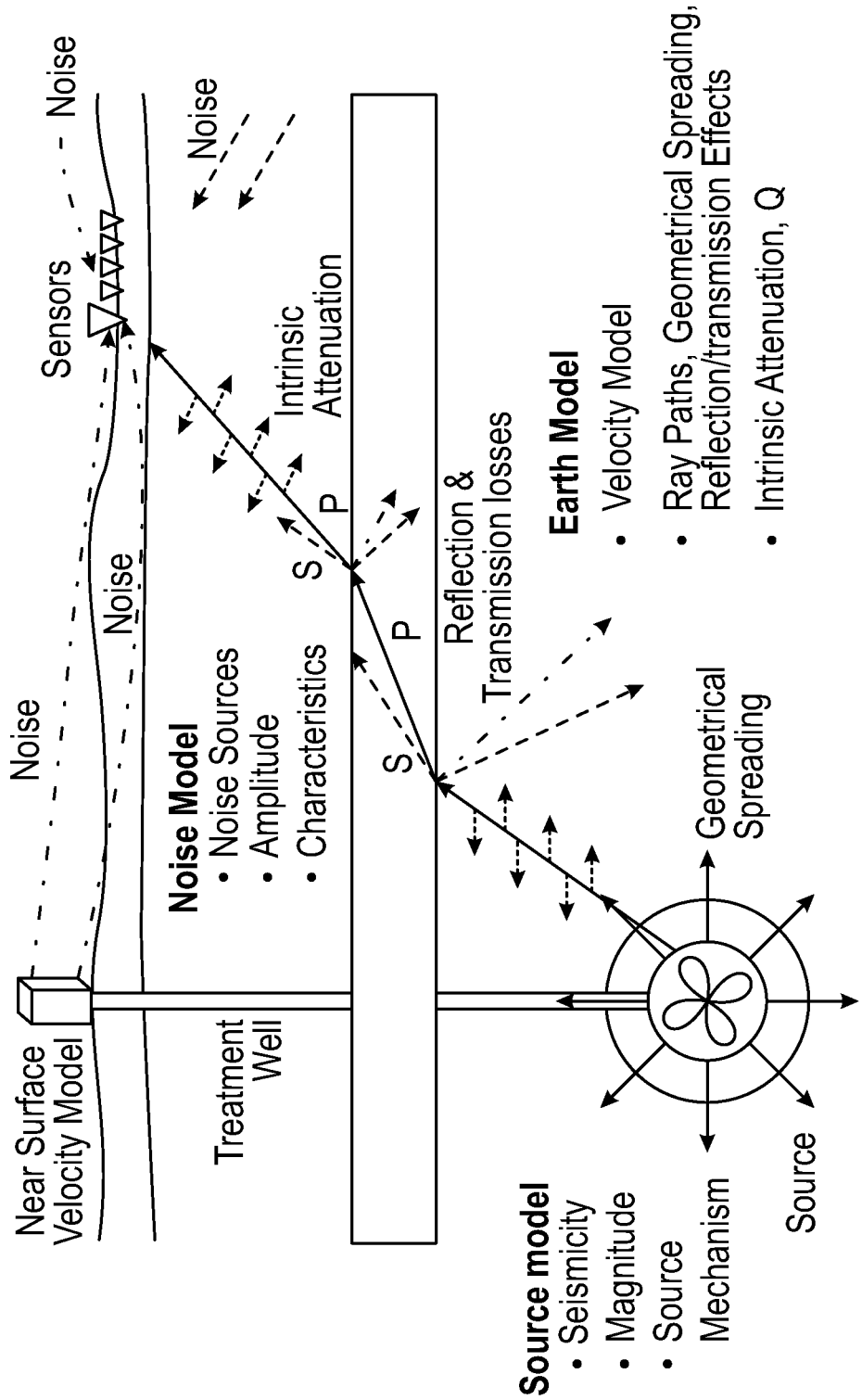
FIG. 3 illustrates a schematic view of a seismic signal acquisition configuration, indicating factors impacting signal detection at a sensor, according to some embodiments.
Figure 4:
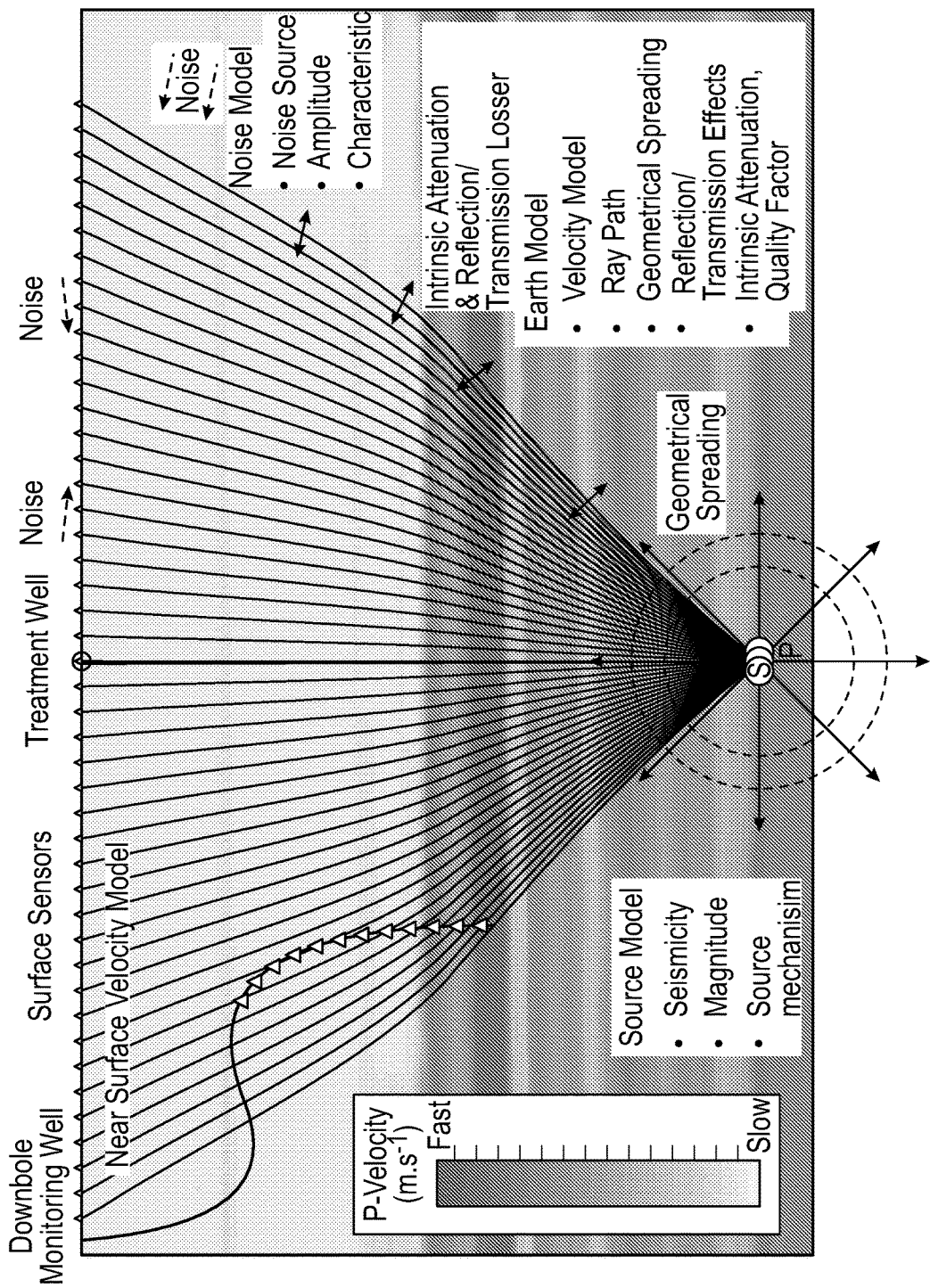
FIG. 4 illustrates an example of an array of surface sensors, according to some embodiments.
Figure 6:
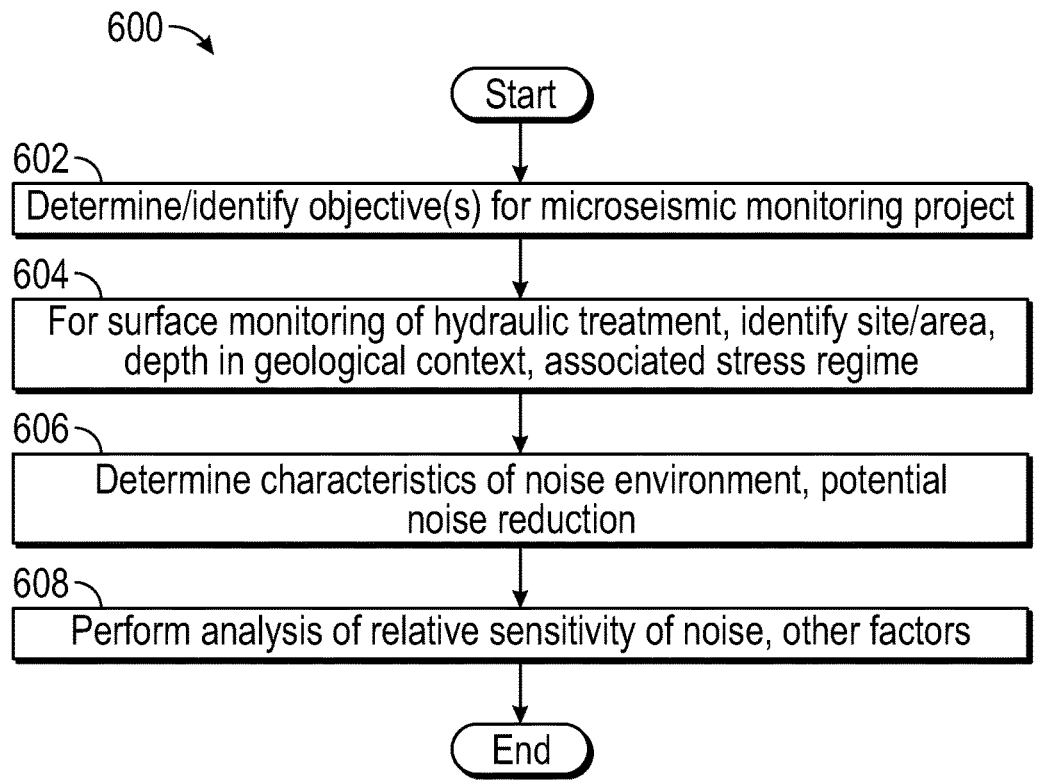
FIG. 6 illustrates a flowchart of aspects of processing of relative sensitivity between two or more factors, according to some embodiments.

In embodiments shown in FIG. 6, an overall workflow 600 can include reaching an understanding of what are the objectives at hand, by for instance to determine and/or identify in 402 one or more goals or objectives for the microseismic monitoring project. If the project involves hydraulic fracturing and/or other hydraulic treatment, in 404 operations can include identifying a site and/or area, a given depth in a specific geological context, and/or an associated stress regime. In a particular hypothetical study, in 406 operations can include determining characteristics of the noise environment and how much potential noise reduction may exist. In 408, operations can include performing an analysis of the relative sensitivity of noise and/or other factors. It will be appreciated that the results of a monitoring campaign can be at least partially dependent on noise and the ability to attenuate it. In a given project and associated environment, the noise model may be associated with the largest degree of outcome uncertainty. This may be the case, for example, in an environment where energetic microseismicity is generated, for example as shown in FIG. 3.

In aspects, once one or more objectives are identified, a data audit can be performed as a preparatory step. In cases, the available relevant data for a given survey may be limited to logs for velocity model building (e.g., sonic, density) and local stress regime evaluation (e.g., image log). Sometimes, VSP and check shot surveys may exist for velocity model calibration, attenuation, and/or other analyzes. In some embodiments, seismic sections may provide cues as to velocity model dip, structures, and local faulting. The available data can be accessed to support a greater understanding of the subterranean environment being dealt with and analyzed. For instance, historical information can also be evaluated, such as seismicity and associated magnitude observed as well as source mechanisms likely to be occurring in the area or zone of interest, so as to select or identify a set of source mechanisms.

Similarly, in a given survey, noise sources may be evaluated. In some embodiments, an initial noise survey can be conducted by deploying sensors to obtain measurements of the noise environment in a project location. In instances, local surveying and satellite imaging can also or instead be consulted to identify noise sources. Knowledge of noise sources can assist in deploying sensors in the most advantageous position, and/or processing the detected signals to improve SNR or other characteristics. An illustrative set of noise sources is listed in Table 1, including physical and electromagnetic disturbances.

TABLE 1

| Noise Sources | Direction | Notes |
|---|---|---|
| Road | Northeast of treatment well (closest approach) | Outer edge of initially considered array may pass within a few hundred meters of road. Noise may depend on traffic level |
| River | Northeast of treatment well (closest approach) | Potential acoustic noise source |
| Power Lines | From east to southwest of the treatment well | Within likely array. Coupling with wind may provide acoustic noise. |
| Wind | Dominant historical direction from SW | Consistent dominant direction with change to west in early summer. |
| Treatment well | From area around treatment well | Pumping, air waves, surface waves and through formation from well. |
| Other field activity | Multiple directions/ sources | |

The identification of the presence, type, and nature of noise sources or influences can assist in adjusting or improving the noise model, as one factor in a microseismic survey or study. In addition, exploring and quantifying aspects of the earth model, as another factor, can also help to refine the survey or study.

Figure 8A:
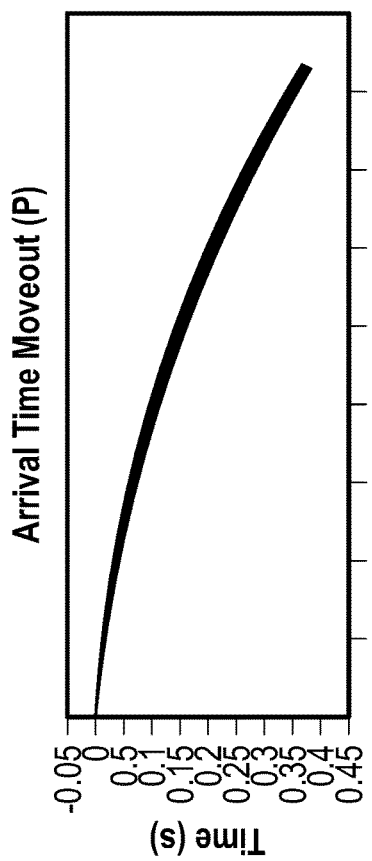
FIGS. 8A and 8B illustrates map of several signal effects, according to some embodiments.
Figure 8B:
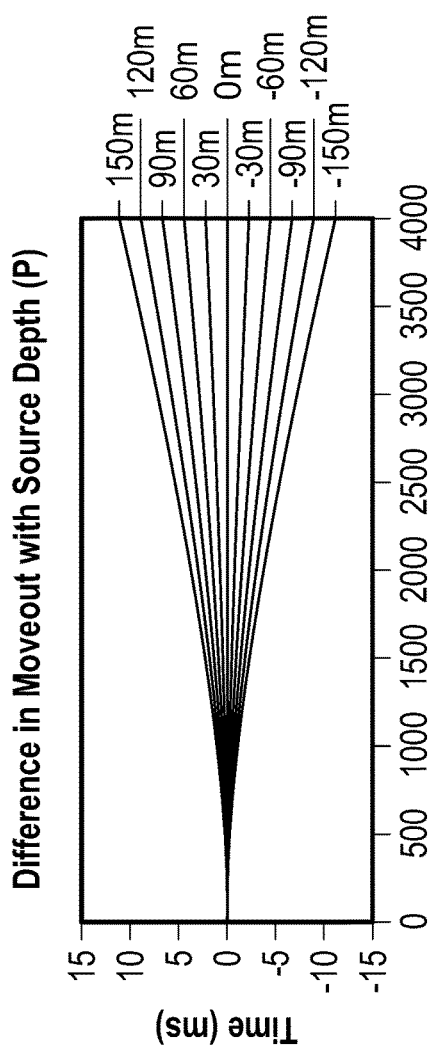

Modelling of the seismic propagation from likely sources to receivers or sensors through the earth model allows the path, travel times, and loss of signal strength to be calculated, as schematically shown in FIGS. 7A-7D. At least three factors contribute to the signal amplitude at surface: (i) source strength (often expressed in terms of seismic moment or a moment magnitude, Mw), (ii) source mechanism or radiation pattern, (iii) signal loss during propagation: geometrical spreading, intrinsic attenuation and transmission losses at boundaries. The effective background noise is the additional factor needed to determine whether signal can be detected. Subsequently, modelling may help consider, for example, three surface measurements that characterize the signal (i) signal amplitude (for a given Mw), (ii) signal-to-noise ratio (for a given Mw) and minimum P-wave magnitude detectable. Aspects of these characteristics are illustrated in FIGS. 8A and 8B.

This assessment can include multiple iterations using multiple assumptions. Once complete, the next stage or phase can include evaluating or further evaluating the noise model, including potential signal-to-noise ratio improvements from array acquisition, noise reduction and processing.

In terms of the noise model as a factor, noise reduction may come from a variety of techniques including (i) station configuration which will depend mainly on the available equipment, (ii) single-station filtering: single-station filters include band-pass filtering and whitening (using a spiking predictive deconvolution) and can be applied to data independent of array type, (iii) coherent in-line noise removal: arrays of station deployed in a line can attenuate coherent noise coming along the line (e.g., noise from treatment well or dominant wind direction), (iv) velocity cancellation, (v) digital beam forming for directional filtering; (vi) stacking which can provide improvements with uncorrelated noise enhancing signal-to-noise ratio.

These considerations can lead to a number of potential sensor configurations, some examples of which are illustratively shown in FIG. 9. As shown, the total amount of noise reduction will depend on noise characteristic on location, and characteristics of the array used It is possible to obtain effective noise reduction of a factor in the hundreds, with favorable array choice and a high enough station count. Once a given array geometry is selected based on the nature of the noise and a satisfactory or advantageous way to maximize its reduction, modelling the final array performance may take place, once again using iterations on multiple parameters and assumptions (e.g., target zone modelled, stacking geometry, intrinsic attenuation, source mechanism, etc. Aspects of the assessment of array performance are illustratively shown in FIGS. 10A-10C.

Figure 10A:
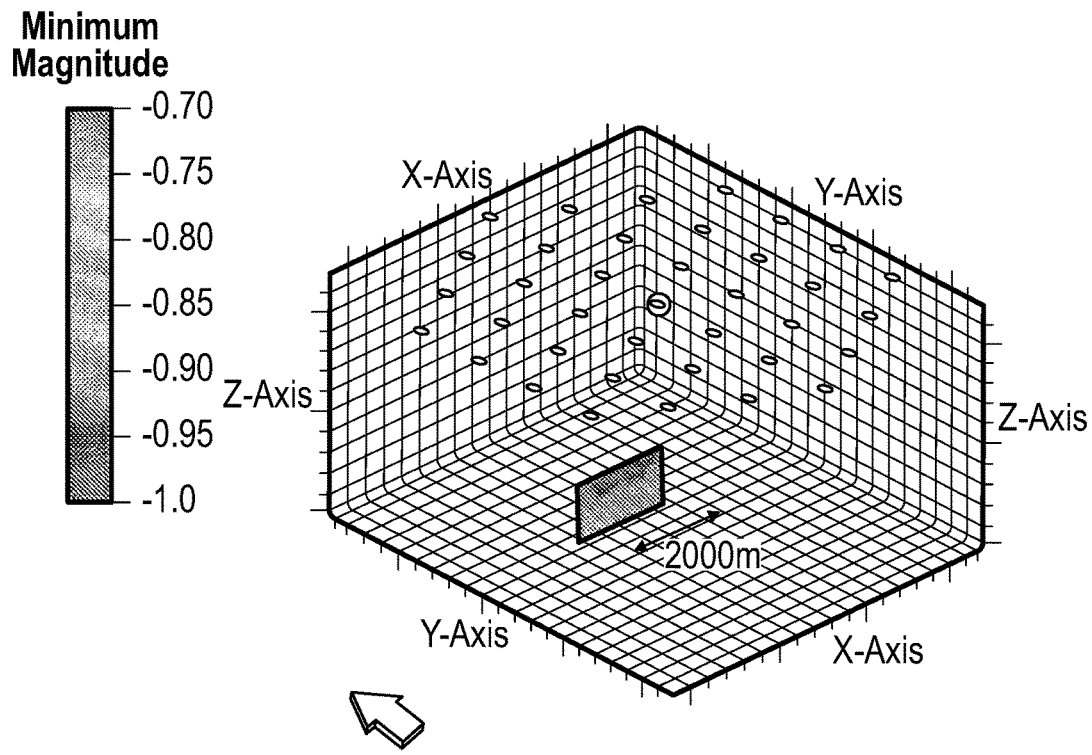
FIGS. 10A, 10B, and 10C illustrate aspects of array performance, according to some embodiments.
Figure 10B:
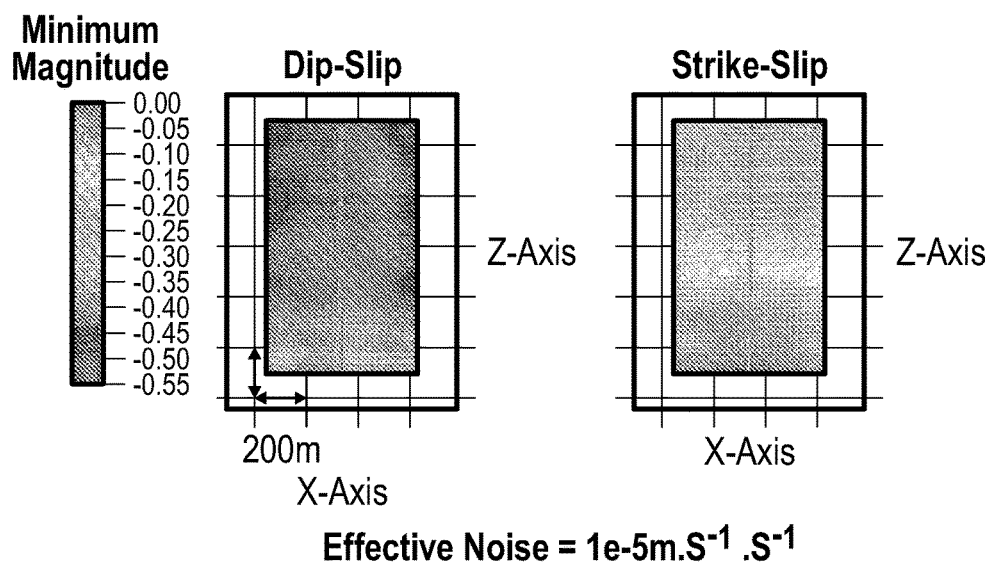
Figure 10C:
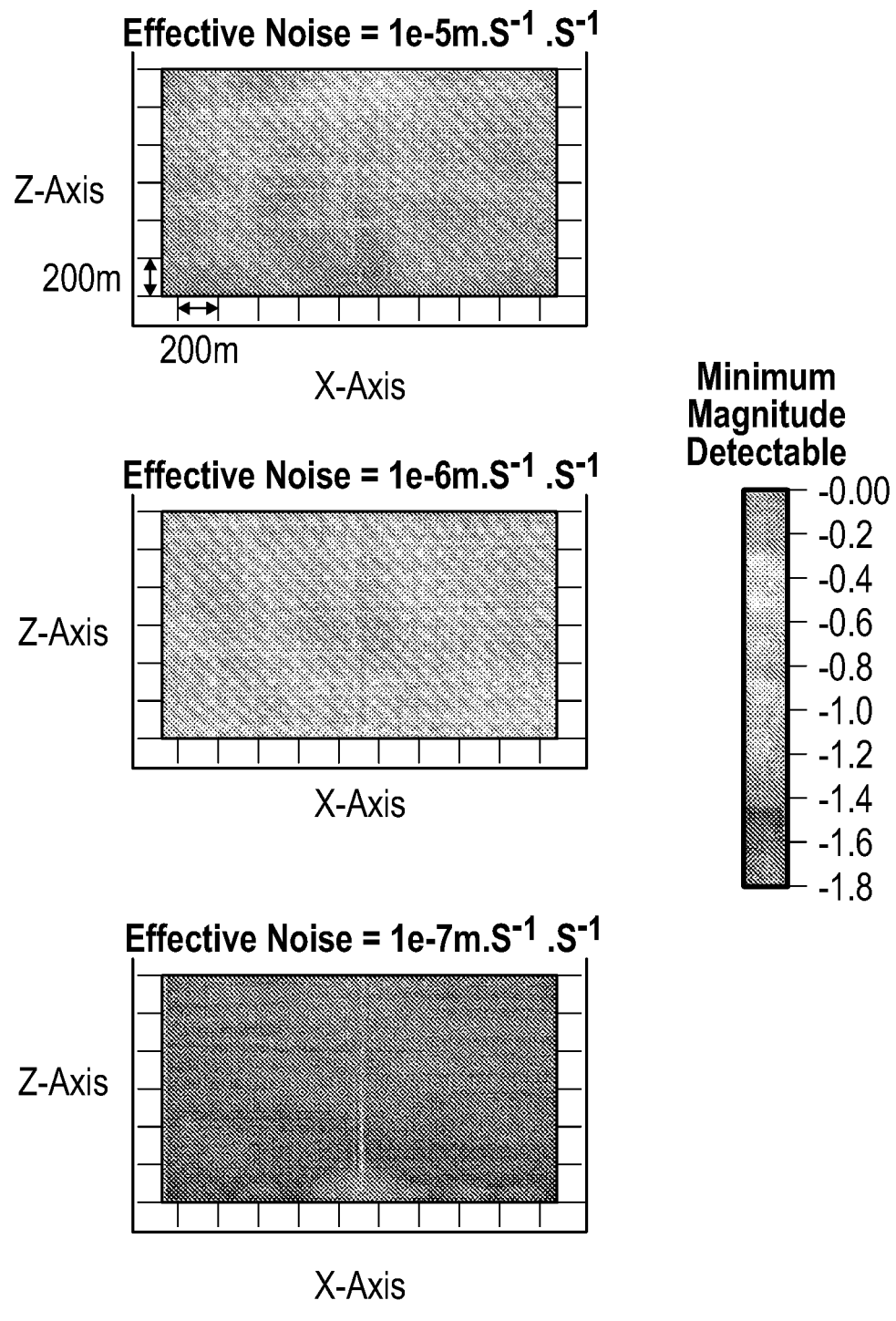

As shown in FIG. 10A, an earth volume can be modelled, including to show minimum magnitudes detected by a sensor array using stacked stations on patch, and a given intrinsic attenuation. As shown in FIG. 10B, a cross-section can be generated illustrating the detectability for a given noise and source mechanism strike-slip (left) and dip-slip (right). As shown in FIG. 10C, a range of minimum magnitude detectable events for various effective noise conditions can be identified, assuming a given source mechanism. In examples as shown, one order of magnitude in noise yields a magnitude of detection change of 0.7. Other values can be derived.

Sensitivity Analysis

According to some embodiments, after the properties and characteristics of the microseismic factors are established and analyzed, further calculation and evaluation can take place. In aspects, that further analysis or treatment can be or include a sensitivity analysis for the factors, and/or two or more factors compared to each other.

The following example illustrates an embodiment of a method for performing a sensitivity analysis, and illustrates a workflow for combining the sensitivity analysis with examination of different scenarios to predicting the impact of acquiring extra data or actually acquiring it, or deploying a specific network.

A sensitivity analysis, such as, for example, a single-factor sensitivity analysis may be applied to assess microseismic monitoring projects in terms of risk in the monitoring projects. This analysis may be iterated using different factors, so as to identify factors where the lack of knowledge represents largest risks. The technique may also show how the knowledge of the risks may be reduced by acquiring more information, such as getting more information on the noise environment or obtaining measurements of the intrinsic attenuation, Q, between reservoir and surface.

The following workflow may illustrate a sensitivity analysis combined with a scenario modelling:

For individual factors of a plurality of factors:
  a. Conduct a single-factor sensitivity test based on the factor.
    i. Estimate a base case
    ii. Estimate 10% and 90% extremes
  b. Vary the factor with others kept at base value.

Determine which factors the analysis is sensitive to relative to other factors.

Target extra information gathering on the factors to which the analysis is sensitive.

Investigate different scenarios where factors are changed either by increasing knowledge of these factors and/or by changing part of workflow, e.g., acquisition geometry as shown in FIG. 9.

Any number of factors may be included in the calculation. As an example and noted herein, at least three factors may be considered. The three factors represent three aspects that may at least partially determine the detection of microseismic events: the source model, earth model, and noise model. The source model can be represented by a value for the expected magnitude Mw (Mmax) of the Nmax largest events expected to occur, and the expected b-value of the population of microseismic events. The earth model can use a value for intrinsic attenuation, Q in forward modelling computations. The noise model can use RMS noise in forward modelling, as well. In addition, the forward modelling software or computations themselves can provide a minimum Mag detectable (M1). It will again be appreciated that other numbers or types of factors, models, and/or association computations can be used.

The following can be used to calculate number of events that may be detected (N1)

TABLE 2

Values for low, base and high cases for three factors that can be used in sensitivity analysis.

|  | Low (10%) | Base (50%) | High (90%) |
|---|---|---|---|
| Q | 100 | 80 | 60 |
| Noise RMS (m/s) | 5.00E−08 | 1.00E−07 | 1.00E−06 |
| Max Mw | −2.0 | −1.5 | −1 |

The sensitivity of the number of events detected to these three model parameters may be investigated, reflecting in the source, earth, and noise models.

In this implementation, the sensitivity may be simplified to three parameters, one for the source model (Mw), earth model (Q) and noise model (Noise RMS), respectively.

Create velocity models with specified Q values.

Use survey design software (NetMod in this case) to calculate minimum magnitude detectable for P wave at stations using Noise RMS.

A representative minimum detection magnitude may be employed. Such minimums may be determined either by taking values from individual sensors at a station or using a statistic based on at least some stations. This could include, but is not limited to, mean or median value from at least some receivers, maximum value, minimum value, and/or weighted average.

The calculations may then be repeated for the three different noise models and three velocity models, which may yield a table of results of minimum magnitude detectable, as below.

TABLE 3

Minimum magnitude detectable, M1, values for combinations of 10%, 50%, and 90% models.

| Noise\Q | 100 | 80 | 60 |
|---|---|---|---|
| 5.00E−08 | −2.52 | −2.35 | −2.14 |
| 1.00E−07 | −2.32 | −2.15 | −1.94 |
| 1.00E−06 | −1.64 | −1.47 | −1.26 |

Figure 11:
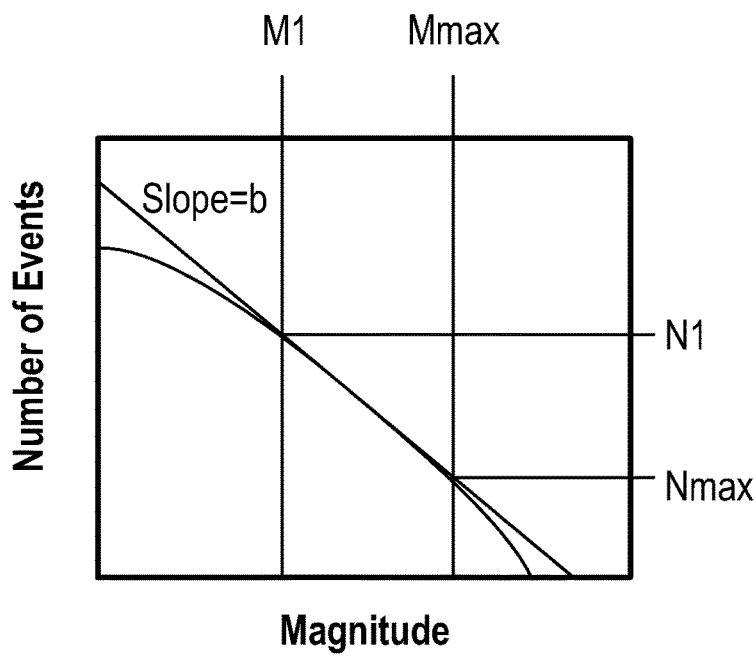
FIG. 11 illustrates a plot of an event magnitude distribution, according to some embodiments.

The third parameter used to represent the source model, the maximum magnitude, or another parameter or variable, may then be used in a separate calculation using the minimum detectable magnitude from above, M1, and a representative b-value. FIG. 11 illustrates an event-magnitude distribution, according to some embodiments. As shown, the b-value may be a measure of the slope of the relative distribution of large events to smaller events in a microseismic event population when plotted on a log-log plot (reference). A value for N1 may be calculated, which may be the number of events above the minimum detectable magnitude, M1. The other input to this calculation may be the event magnitude of the $Nmax^{th}$ largest event. For example, Mmax may be the magnitude of the $10^{th}$ largest event. With M1, Mmax, Nmax and the slope b, N1 may be calculated as follows:

TABLE 4

Example Algorithm for Calculating the Number of Detectable Events, N1

Log (Nmax) = a − b * Mmax
Log (N1) = a − b * M1
therefore
N1 = Nmax / (10 ^ ( −b * (Mmax−M1) ))

Use the minimum detectable magnitude (M1) to calculate number of events (N1) created tables in a spreadsheet template (see table above)
  a. N1=Nmax/(10^(−b(Mmax−M1)))
  b. Nmax=10
Mmax is magnitude of $10^{th}$ biggest event in a stage
  c. b=1.5
Example of a b-value for hydraulic fracture
  d. M1 is minimum detectable magnitude from calculations based on output from survey design software Seven combinations can be calculated for single-factor sensitivity analysis and tornado chart output, again as illustratively shown in FIG. 12. Other types of sensitivity analysis could make use of the other combination of factors.

TABLE 5

Predicted number of events for combinations of sensitivity models (The seven highlighted factors are illustratively used in single-factor sensitivity analysis and a tornado chart).

| Mw max | −2 | | |
|---|---|---|---|
| Noise\Q | 100 | 80 | 60 |
| 5.00E−08 | 60 | 33 | 16 |
| 1.00E−07 | 30 | *17* | 8 |
| 1.00E−06 | 3 | 2 | 1 |
| Mw max | −1.5 | | |
| Noise\Q | 100 | 80 | 60 |
| 5.00E−08 | 339 | *188* | 91 |
| 1.00E−07 | *170* | *94* | *46* |
| 1.00E−06 | 16 | *9* | 4 |
| Mw max | −1 | | |
| Noise\Q | 100 | 80 | 60 |
| 5.00E−08 | 1905 | 1059 | 513 |

TABLE 5-continued

Predicted number of events for combinations of sensitivity models (The seven highlighted factors are illustratively used in single-factor sensitivity analysis and a tornado chart).

| 1.00E−07 | 955 | *531* | 257 |
|---|---|---|---|
| 1.00E−06 | 91 | 51 | 25 |

A tornado chart (e.g., FIG. 12) is again one way to represent this data, to plot such a chart further statistical calculations are employed using these results. The variance of the results may be calculated. To do this, the swing and square of the swing may be calculated. The results may then be sorted by the % variance to give the tornado chart with largest variance factor at the top. For example, the tornado chart may be determined according to the following workflow:

TABLE 6

Workflow For Determining the Tornado Chart

Figure 12:
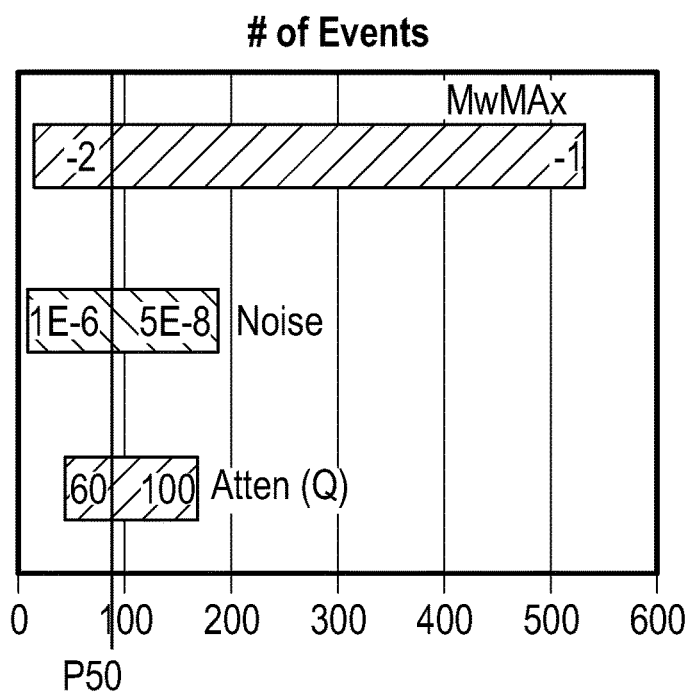
FIG. 12 illustrates a tornado chart of sensitivity analysis of three factors in a microseismic monitoring project, according to some embodiments.

Select low/base/high values for parameters for base values on other parameters
Calculate Swing, Swing^2 & Variance
 a.   Swing = max(low, base, high)−min(low, base, high) for the
      individual variables/factors
 b.   Variance = Swing^2/Sum(Swing^2(Mag, Noise, Atten))
Results sorted by % variance
This may give largest variance at top of tornado chart
Low = Optimistic / Good
Low → less noise, less attenuation, bigger events
High = Pessimistic / Bad
High → more noise, more attenuation, smaller events In this example, the magnitude has the greatest variance in predicted event numbers, and hence is presented at the top of tornado chart of FIG. 12. However, noise as a factor may yield or cause a relatively small number of events in the worst case scenario, and therefore may present a relatively high risk of project failure. The following workflow may be employed:

In the preceding example, the magnitude has the greatest variance in predicted event numbers, and hence is presented at the top of tornado chart of FIG. 12. However, noise as a factor may yield or cause a relatively small number of events in the worst case scenario, and therefore may present a relatively high risk of project failure. Other risk scenarios are possible.

Figure 13:
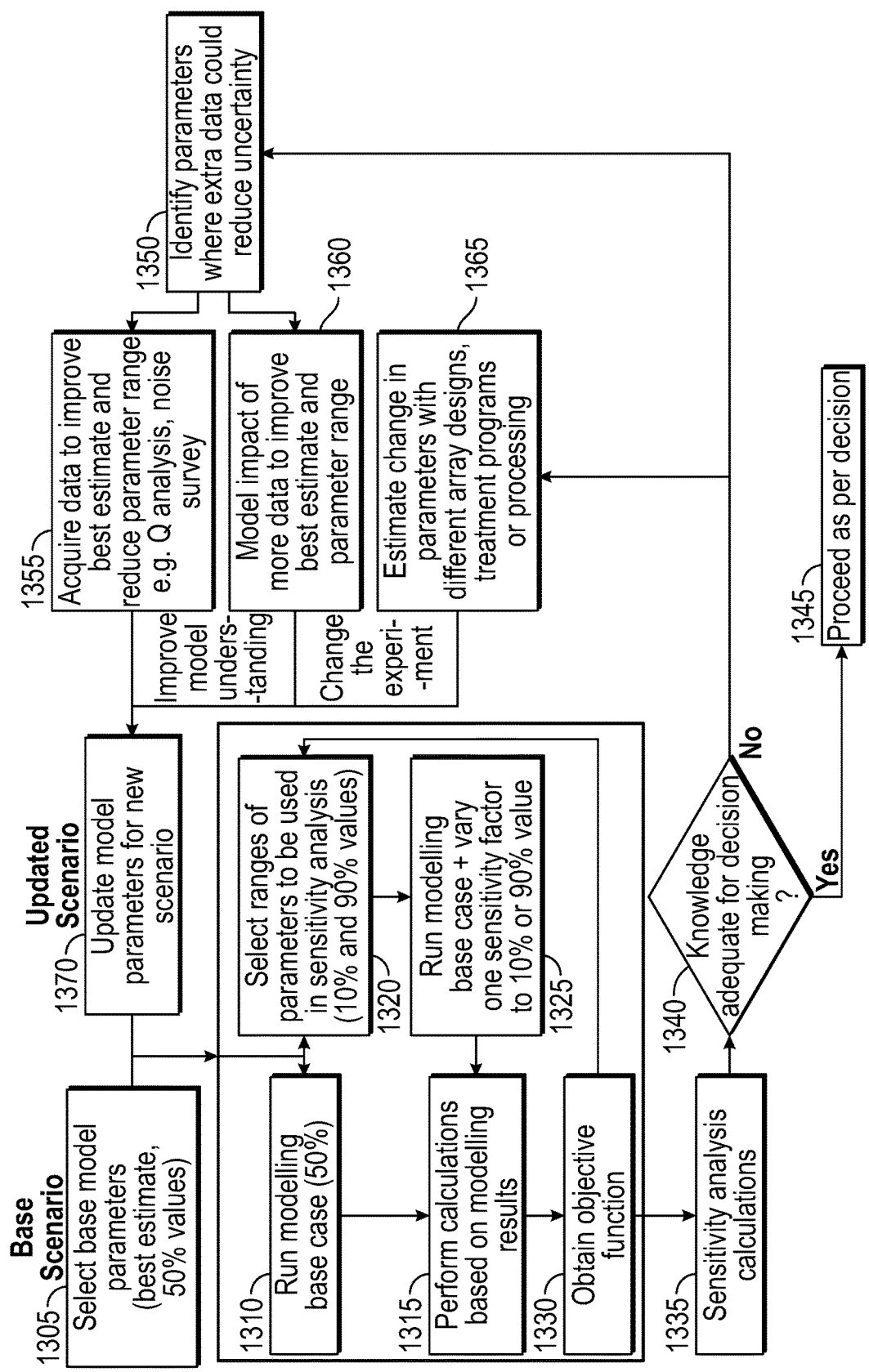
FIG. 13 illustrates a flowchart of a method for sensitivity analysis and scenario modelling, according to some embodiments.

FIG. 13 illustrates a flowchart of a method 1300 for sensitivity analysis and scenario modelling, according to an embodiment. It will be appreciated that the blocks shown are merely examples and/or may be omitted or performed in a different order.

Initial Base Scenario Setup

In 1305, initial parameters for modelling may be selected. These values may be an estimate of likely values to occur, e.g., 50% probability values. These may form the base scenario case.

Sensitivity Analysis

In 1310, the modelling can be run using base parameter values. In 1315, the results of modelling may be used in further calculations, e.g., the minimum magnitude may be detected. Next, in 1330 an objective function may be calculated and, e.g., a number of events detected. In 1335, processing may then enter a sensitivity analysis loop starting in 1320. In 1320, parameters used in the sensitivity analysis may be selected and range selected, e.g., the 10% and 90% values. In 1325, the modelling may then be repeated, e.g., with parameter changes. For example, one parameter may be changed to a 10% or 90% value and with other parameters at base case values. Some parameters may be included in calculations after modelling, and thus may skip this aspect of the method (e.g., Maximum magnitude Mw). The results of modelling in 1315 may likewise be used in further calculations (e.g., Minimum magnitude detected). The objective function may then be calculated and, e.g., a number of events detected. These aspects may be repeated, e.g., until values for sensitivity analysis meet a certain target, e.g., the sensitivity parameters with 10% and 90% values. The sensitivity analysis may then be carried out on the objective function, e.g., a tornado chart may be created.

Assess Results

Assessing the results may follow the following workflow. In 1340, a determination may be made whether the knowledge about monitoring is good enough for a decision to be made.

The determination of 1340 may produce an answer of no, based on one or more parameters.
  a. Highly sensitive to Q, knowledge is too limited to predict viability of project.
  b. Noise too high but might be reduced by different acquisition/processing
  c. More scenarios need to be modelled
  d. Continue to scenario updates The determination of 1340 may produce an answer of yes, based on one or more parameters. Processing can then continue to 1345, in which a decision or determination can be made and operations can proceed per the decision. In cases, for instance, an array design scenario can be found for the experiment. In cases, generally speaking the microseismic monitoring appears to be viable, for instance based on an objective function, and a determination can be made to proceed with the project. In cases, for further instance, it may be determined in 1345 that there is little or no chance that microseismic monitoring will work on the subject project with the monitoring options available.

Scenario Updates

If the determination of 1340 is no, processing can proceed to 1350. In 1350, parameters can be identified where extra data on physical properties may reduce uncertainty and improve understanding. In 1355, data to improve knowledge of estimate and range can be acquired. For example, Q analysis, noise survey data can be acquired. In 1360, the model impact of acquiring more data can be determined, in embodiments concurrently with 1355, using e.g. scenario or "what if" modelling and/or can represent an improvement in model understanding.

In 1365, a change in parameters with different array designs, treatment programs or processing can be estimated, in embodiments concurrently with 1355 and 1360. In aspects, this can represent a change in the experiment.

In 1370, model parameters can be updated for a new scenario. With newly acquired data values, predicted values of how new data might affect model, and/or with parameter changes due to change in array, treatment or processing, a sensitivity analysis can be rerun, and results for the scenarios being modelled can be assessed. Various processing in 1305 through 1365 can be repeated.

Scenario Modelling

Figure 14:
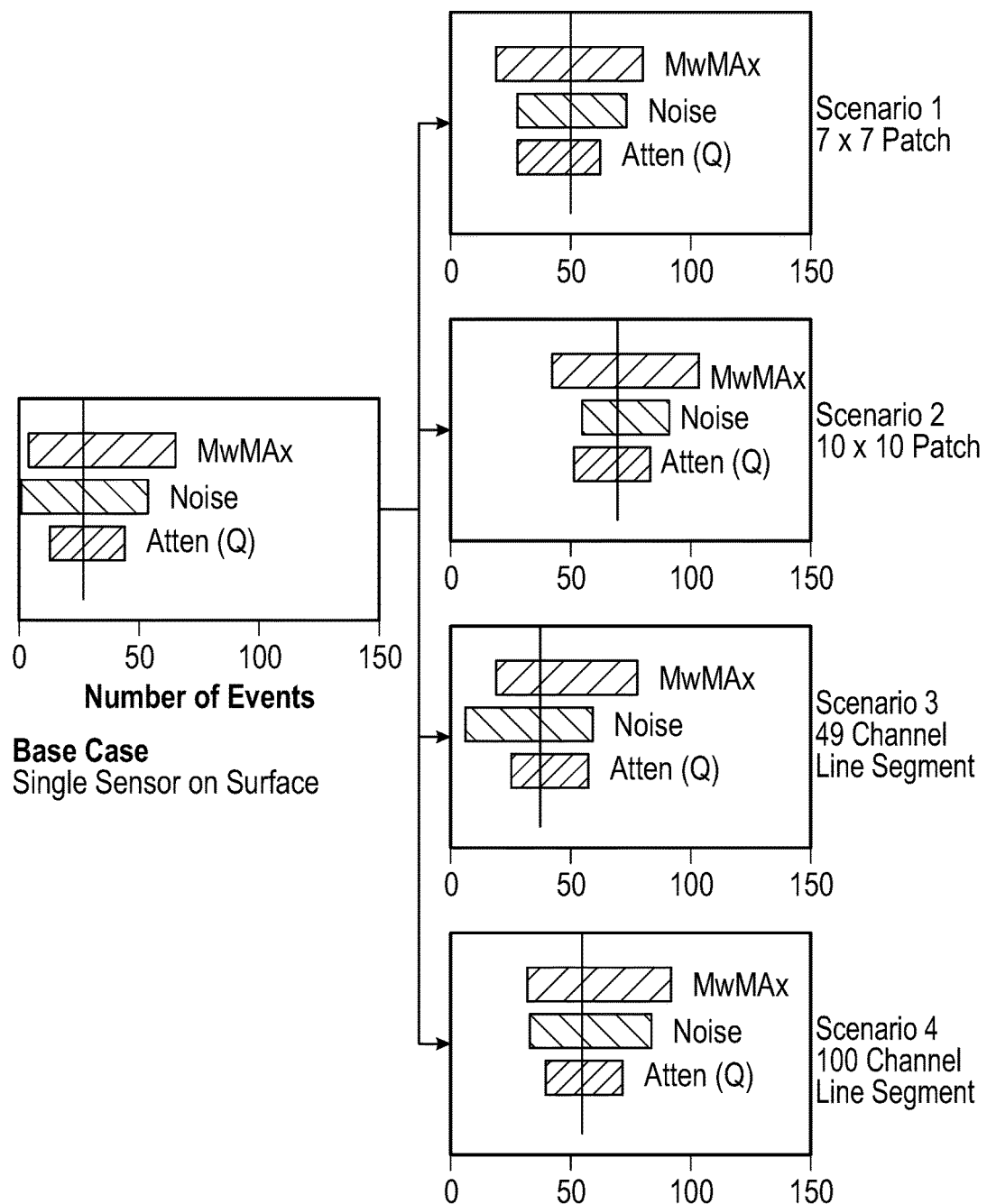
FIG. 14 illustrates a schematic view of scenario modelling of different sensor network designs or placements, according to some embodiments.

Embodiments of the present disclosure may include applying the sensitivity analysis in microseismic monitoring and combination with scenario modelling. FIG. 14 illustrates an example of scenario modelling. The scenarios that can be modelled include showing changes in sensitivity analysis, such as a tornado chart (e.g., as shown in FIG. 12), from acquiring more data, showing the impact of different types of microseismic acquisition (in terms of systems, channel count, geometries) and application of different processing workflows. The objective function used in the sensitivity analysis in example above was the number of events that would be detected; however, other objective functions may be used.

By acquiring more data or performing further analysis to constrain our knowledge of the factors, the analysis may be re-run, and the reduction of sensitivity to the factors may be determined, as well as how uncertainty in expected outcome is reduced. If the initial 10% and 90% values are accurate first estimates, then the addition of new information may reduce the variance and for base value to change within the earlier range of values. If adding an extra data sample, 80% of samples may be expected to fall within these bounds. If the initial estimates of bounds was under- or over-confident, larger changes in range may be expected based on the addition of new information.

In the example case, the magnitude and attenuation are physical properties that may not be expected to change, so increased knowledge thereof should narrow their bounds and adjust the base value. For the noise, the value can reflect the final noise going into the microseismic event detection and location process, in addition to or instead of the raw noise. Noise reduction achieved from stacking, filtering, etc. can be reflected in these values therefore a change that results in a different noise reduction process can provide large change in the base and bounding values. For example, considering a patch geometry, noise reduction may be included from beamforming directional noise suppression and stacking the sensors. Including this may result in a shift in the original base value and bounds of the noise analysis.

The sensitivity analysis may be carried out using a range of different factors and using different objective functions rather than number of events used in this example. Factors that may be used in the sensitivity analysis include but are not limited to: earth model, Q models, formation velocities, number of layers, level of smoothing etc., source model, source mechanism (type and orientation), magnitude distribution, maximum magnitudes, noise model, spatially varying noise models, more complete noise description (e.g., spectra, direction), array designs, number of sensors, noise suppression methods, SNR enhancement techniques, and sensor characteristics. The sensitivity factor may be a single-parameter or a combination of other parameters.

Objective functions that may be used include the number of detectable events, minimum magnitude detectable, and signal-to-noise ratio of specified event magnitude. The objective function values may be derived from any combination of results from modelling results, or values derived from them, based on station or event values and a statistical representation of any of these.

The type of sensitivity analysis is not restricted to the single-factor sensitivity analysis. The sensitivity analysis may also use a more complex approach than the single-factor analysis thus allowing the interconnection between different factors to be investigated. Techniques such as Monte-Carlo methods, perturbation methods, and/or other randomized or statistical techniques or calculations, may also be applied. For instance, one or more factor may be varied or flexed over a range of possible values by random or regular amounts in one or more variable, to explore the effects on an objective function or other output. Regular variations of one or more variables can provide a more detailed exploration of sensitivity variation with the different factors. Regardless of the specific technique applied, the sensitivity analysis may allow for conducting calculations upfront and investigating different scenarios thereafter, which may be a faster, more interactive approach.

The results still allow the microseismic monitoring sensitivity analysis scenario modelling to be applied. Compared to a statistical experimental design processes this workflow may facilitate an understanding of the influence of different factors contributing to the likelihood of success.

Figure 15A:
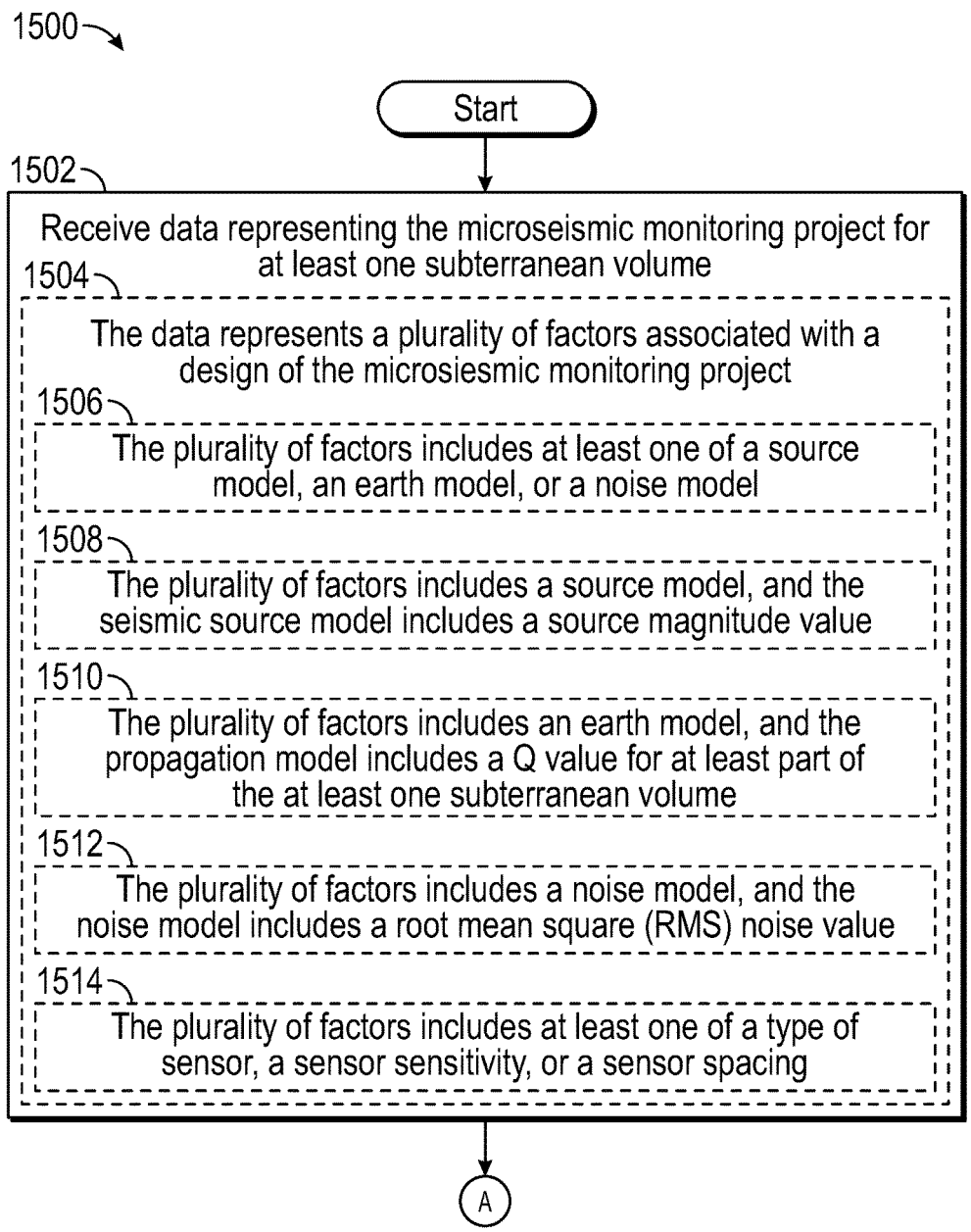
FIGS. 15A and 15B illustrate a flowchart of a method for designing a microseismic monitoring project, according to some embodiments.
Figure 15B:
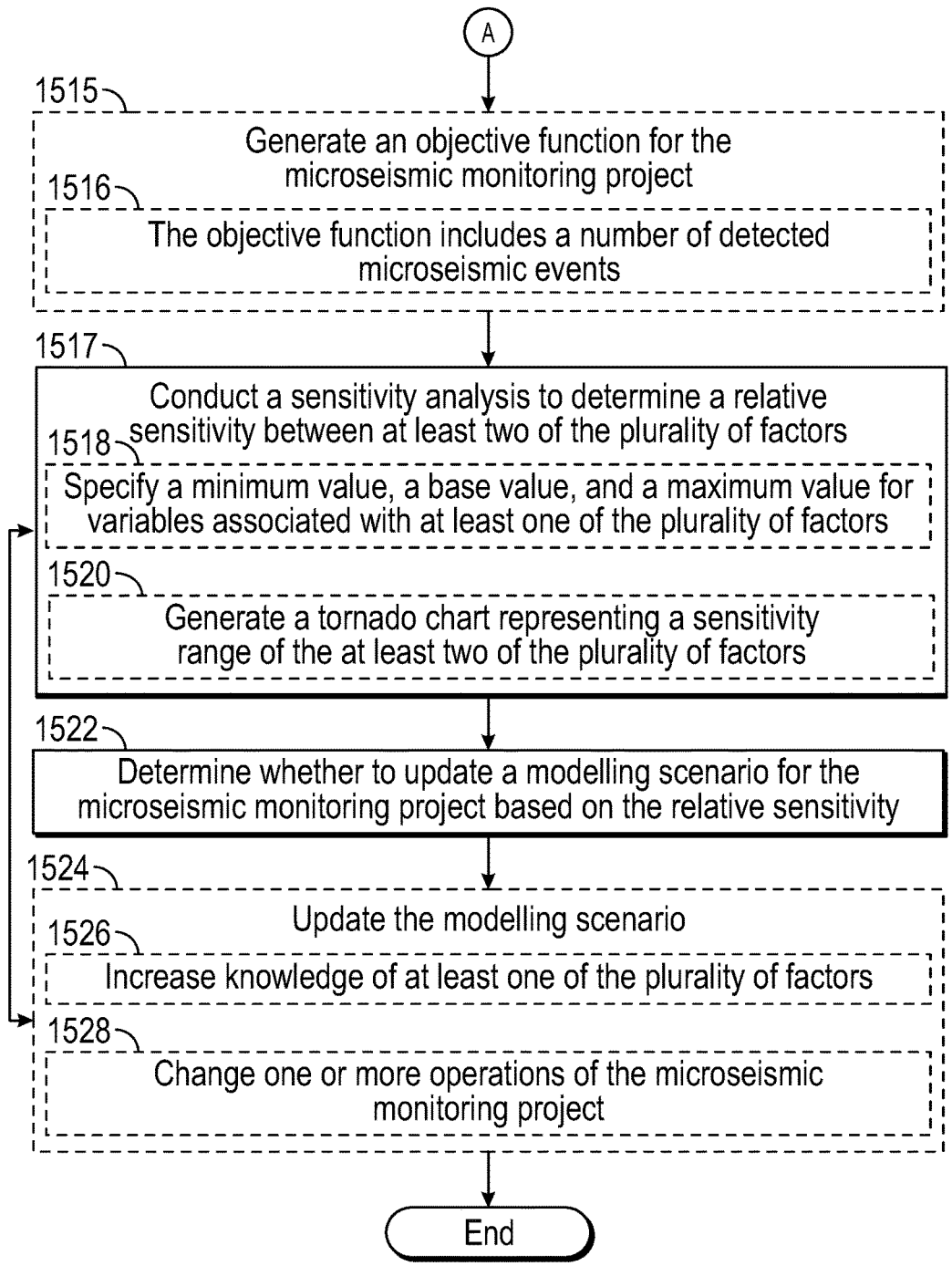

FIGS. 15A and 15B illustrate a flowchart of a method 1500 for designing a microseismic monitoring project, according to an embodiment. The method 1500 can include receiving data representing the microseismic monitoring project for at least one subterranean volume, as at 1502 (e.g., FIG. 1, block 102). The data can include data representing a plurality of factors associated with a design of the microseismic monitoring project, as indicated at 1504 (e.g., FIG. 1, block 102). In some embodiments, the plurality of factors can include at least one of a source model, an earth model, or a noise model, as at 1506 (e.g., FIG. 5, block 502). In some embodiments, the plurality of factors includes a source model, and the seismic source model includes a source magnitude value, as at 1508 (e.g., FIG. 5, block 502). In some embodiments, the plurality of factors includes an earth model, and the propagation model includes a Q value for at least part of the at least one subterranean volume, as at 1510 (e.g., FIG. 5, block 502). In some embodiments, the plurality of factors includes a noise model, and the noise model includes a root mean square (RMS) noise value, as at 1512 (e.g., FIG. 5, block 502). In some embodiments, the plurality of factors includes at least one of a type of sensor, a sensor sensitivity, or a sensor spacing, as at 1514 (e.g., FIG. 5, block 508).

In some embodiments, the method 1500 also includes generating an objective function for the microseismic monitoring project, as at 1515 (e.g., FIG. 13, block 1330). The objective function includes a number of detected microseismic events, as at 1516.

The method 1500 can also include conducting a sensitivity analysis to determine a relative sensitivity between at least two of the plurality of factors, as at 1517 (e.g., FIG. 1, block 106; factors are analysed to determine which contribute to project uncertainty; e.g., FIG. 6, block 608; e.g., FIG. 13, block 1335). In some embodiments, conducting the sensitivity test includes specifying a minimum value, a base value, and a maximum value for variables associated with at least one of the plurality of factors, as at 1518 (e.g., FIG. 5, block 510; statistical analysis includes setting such values; e.g., FIG. 13, blocks 1310, 1320, 1325). In some embodiments, determining the relative sensitivity includes generating a tornado chart representing a sensitivity range of the at least two of the plurality of factors, as at 1520 (e.g., FIG. 12).

The method 1500 can further include determining whether to update a modelling scenario for the microseismic monitoring project based on the relative sensitivity, as at 1522 (e.g., FIG. 13, block 1340). The method 1500 can include updating the modelling scenario, as at 1524 (e.g., FIG. 13, block 1370). Further, updating the modelling scenario can include one or both (i.e., at least one) of increasing knowledge of at least one of the plurality of factors, as at 1526 (e.g., FIG. 13, block 1355), or changing one or more operations of the microseismic monitoring project, as at 1528 (e.g., FIG. 13, block 1365).

Figure 16:
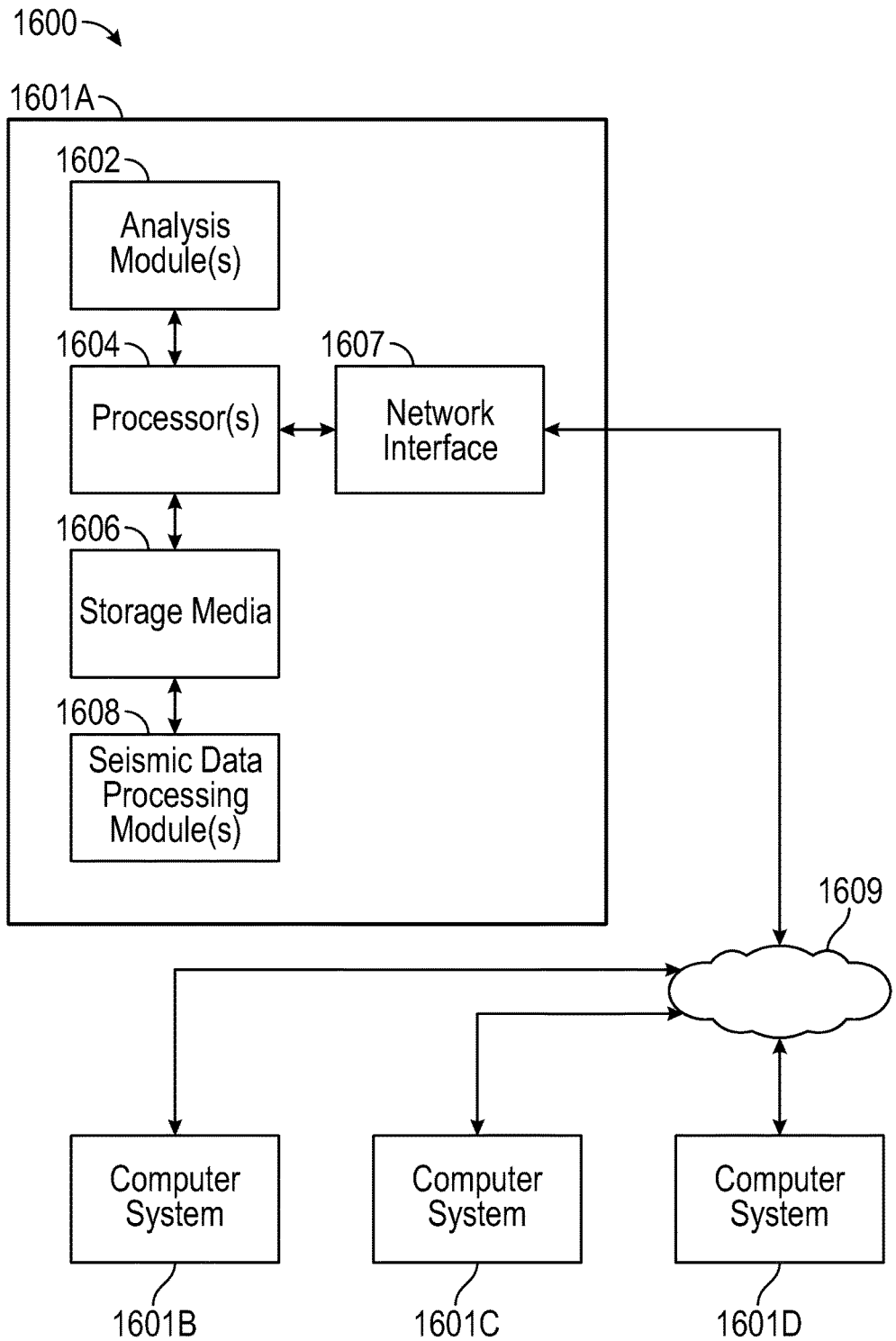
FIG. 16 illustrates a schematic view of a computing or processor system for performing the method, according to some embodiments.

In some embodiments, the methods of the present disclosure may be executed by a computing system. FIG. 16 illustrates an example of such a computing system 1600, in accordance with some embodiments. The computing system 1600 may include a computer or computer system 1601A, which may be an individual computer system 1601A, or an arrangement of distributed computer systems. In embodiments, computing system 1600 can be or include a cloud-based computing platform, and/or other local, remote, and/or network computing platform or service. The computer system 1601A includes one or more analysis modules 1602 that are configured to perform various tasks according to some embodiments, such as one or more methods disclosed herein. To perform these various tasks, the analysis module 1602 executes independently, or in coordination with, one or more processors 1604, which is (or are) connected to one or more storage media 1606. The processor(s) 1604 is (or are) also connected to a network interface 1607 to allow the computer system 1601A to communicate over a data network 1609 with one or more additional computer systems and/or computing systems, such as 1601B, 1601C, and/or 1601D (note that computer systems 1601B, 1601C and/or 1601D may or may not share the same architecture as computer system 1601A, and may be located in different physical locations, e.g., computer systems 1601A and 1601B may be located in a processing facility, while in communication with one or more computer systems such as 1601C and/or 1601D that are located in one or more data centers, and/or located in varying countries on different continents).

A processor can include a microprocessor, microcontroller, processor module or subsystem, programmable integrated circuit, programmable gate array, or another control or computing device.

The storage media 1606 can be implemented as one or more computer-readable or machine-readable storage media. Note that while in some example embodiments of FIG. 16 storage media 1606 is depicted as within computer system 1601A, in some embodiments, storage media 1606 may be distributed within and/or across multiple internal and/or external enclosures of computing system 1601A and/or additional computing systems. Storage media 1606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1600 contains one or more seismic data processing module(s) 1608. In the example of computing system 1600, computer system 1601A includes the seismic data processing module 1608. In some embodiments, a single seismic data processing module may be used to perform at least some aspects of one or more embodiments of the methods disclosed herein. In embodiments, a plurality of seismic data processing modules may be used to perform at least some aspects of methods disclosed herein.

It should be appreciated that computing system 1600 is but one example of a computing system, and that computing system 1600 may have more or fewer components than shown, may combine additional components not depicted in the example embodiment of FIG. 16, and/or computing system 1600 may have a different configuration or arrangement of the components depicted in FIG. 16. The various components shown in FIG. 16 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection.

Geologic interpretations, models and/or other interpretation aids may be refined in an iterative fashion; this concept is applicable to methods as discussed herein. This can include use of feedback loops executed on an algorithmic basis, such as at a computing device (e.g., computing system 1600, FIG. 16), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit embodiments to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain the principals of embodiments and its practical applications, to thereby enable others skilled in the art to utilize embodiments and various embodiments with various modifications as are suited to the particular use contemplated.

What is claimed is:

1. A method for designing a microseismic monitoring project, comprising:
receiving data representing the microseismic monitoring project for at least one subterranean volume, the data comprising data representing a plurality of factors associated with a design of the microseismic monitoring project, wherein the plurality of factors comprises at least one of:
a type of sensor,
a sensor sensitivity, or
a sensor spacing;
determining a base modelling scenario based on uncertainties, risks, or both associated with the plurality of factors;
conducting a sensitivity analysis to determine a relative sensitivity between at least two of the plurality of factors for the base modelling scenario, wherein conducting the sensitivity analysis comprises selecting at least one of the plurality of factors based on the relatively sensitivity; and
acquiring additional data configured to decrease uncertainty for the at least one of the plurality of factors by deploying one or more sensors to collect the additional data,
updating the base modelling scenario using the additional data,
conducting a sensitivity analysis to determine a relative sensitivity between the at least two of the plurality of factors for the updated modelling scenario,
determining whether to proceed with conducting the microseismic monitoring project using the design based on the sensitivity analysis for the updated modelling scenario.

2. The method of claim 1, wherein updating the base modelling scenario further comprises changing one or more operations of the microseismic monitoring project.

3. The method of claim 1, wherein the plurality of factors comprises at least one of:
a source model,
an earth model, or
a noise model.

4. The method of claim 3, wherein the plurality of factors comprises a source model, and the source model comprises a source magnitude value.

5. The method of claim 3, wherein the plurality of factors comprises an earth model, and the earth model comprises a Q value for at least part of the at least one subterranean volume.

6. The method of claim 3, wherein the plurality of factors comprises a noise model, and the noise model comprises a root mean square (RMS) noise value.

7. The method of claim 1, wherein determining the relative sensitivity comprises generating a tornado chart representing a sensitivity range of the at least two of the plurality of factors.

8. The method of claim 1, wherein conducting the sensitivity analysis comprises specifying a minimum value, a base value, and a maximum value for variables associated with at least one of the plurality of factors.

9. The method of claim 1, further comprising generating an objective function for the microseismic monitoring project, wherein the objective function comprises a number of detected microseismic events.

10. A non-transitory computer-readable medium storing instructions that, when executed by one or more processors of a computing system, cause the computing system to perform operations, the operations comprising:
receiving data representing a microseismic monitoring project for at least one subterranean volume, the data comprising data representing a plurality of factors associated with a design of the microseismic monitoring project, wherein the plurality of factors comprises at least one of:
a type of sensor,
a sensor sensitivity, or
a sensor spacing;
determining a base modelling scenario based on uncertainties, risks, or both associated with the plurality of factors;
conducting a sensitivity analysis to determine a relative sensitivity between at least two of the plurality of factors for the base modelling scenario, wherein conducting the sensitivity analysis comprises selecting at least one of the plurality of factors based on the relatively sensitivity; and acquiring additional data configured to decrease uncertainty for the selected at least one of the plurality of factors by deploying one or more sensors to collect the additional data, updating the base modelling scenario using the additional data, conducting a sensitivity analysis to determine a relative sensitivity between the at least two of the plurality of factors for the updated modelling scenario, determining whether to proceed with conducting the microseismic monitoring project using the design based on the sensitivity analysis for the updated modelling scenario.

11. The non-transitory computer-readable medium of claim 10, wherein the base modelling scenario further comprises changing one or more operations of the microseismic monitoring project.

12. The non-transitory computer-readable medium of claim 10, wherein the plurality of factors comprises at least one of:
 a source model,
 an earth model, or
 a noise model.

13. The non-transitory computer-readable medium of claim 10, wherein conducting the sensitivity analysis comprises specifying a minimum value, a base value, and a maximum value for variables associated with at least one of the plurality of factors.

14. The non-transitory computer-readable medium of claim 10, wherein the operations further comprise generating an objective function for the microseismic monitoring project.

15. The method of claim 9, wherein conducting the sensitivity analysis comprises calculating a response of the objective function to decreasing an uncertainty of one or more of the plurality of factors, wherein the objective function is used to determine an expected number or expected range of numbers of detected events in the microseismic monitoring project.

16. A method for designing a microseismic monitoring project, comprising:
 receiving data representing the microseismic monitoring project for at least one subterranean volume, the data comprising data representing a plurality of factors associated with a design of the microseismic monitoring project;
 determining a base modelling scenario based on uncertainties, risks, or both associated with the plurality of factors; and
 conducting a sensitivity analysis to determine a relative sensitivity between at least two of the plurality of factors for the base modelling scenario, wherein conducting the sensitivity analysis comprises selecting at least one of the plurality of factors based on the relatively sensitivity; and
 updating a modelling scenario for the microseismic monitoring project based on the relative sensitivity, wherein updating comprises changing one or more operations of the microseismic monitoring project, wherein the operations include at least one of sensor array design, treatment plan or signal processing workflow
 conducting a sensitivity analysis to determine a relative sensitivity between at least two of the plurality of factors for the updated modelling scenario,
 proceeding with conducting the microseismic monitoring project with the changed operations based on the sensitivity analysis.

* * * * *